United States Patent
Kasper et al.

(10) Patent No.: US 10,814,844 B2
(45) Date of Patent: Oct. 27, 2020

(54) BRAKING CONTROLLER AND METHOD USING VERIFICATION OF REPORTED TRAILER CAPABILITIES

(71) Applicant: Bendix Commercial Vehicle Systems LLC, Elyria, OH (US)

(72) Inventors: Phillip J. Kasper, Elyria, OH (US); Michael D. Tober, Avon, OH (US); Claus Beyer, Elyria, OH (US); Joseph M. MacNamara, Ashland, OH (US); Subashish Sasmal, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 279 days.

(21) Appl. No.: 15/706,432

(22) Filed: Sep. 15, 2017

(65) Prior Publication Data

US 2019/0084534 A1    Mar. 21, 2019

(51) Int. Cl.
*B60T 8/17* (2006.01)
*B60R 16/03* (2006.01)
(Continued)

(52) U.S. Cl.
CPC ............ *B60T 8/1708* (2013.01); *B60D 1/245* (2013.01); *B60D 1/62* (2013.01); *B60R 16/0315* (2013.01);
(Continued)

(58) Field of Classification Search
CPC ... B60T 8/1708; B60R 16/0315; G01B 21/06; B60D 1/62; B60D 1/245
(Continued)

(56) References Cited

U.S. PATENT DOCUMENTS 3,168,352 A    2/1965  Stelzer
3,237,994 A    3/1966  Brandon
(Continued)

FOREIGN PATENT DOCUMENTS

DE    199 64 164 A1    7/2001
DE    10114673 A1    10/2002
(Continued)

OTHER PUBLICATIONS

International Search Report and Written Opinion from correlating International Application No. PCT/US2018/050964, dated Jan. 18, 2019; 43 pages.
(Continued)

*Primary Examiner* — Khoi H Tran
*Assistant Examiner* — Rodney P King
(74) *Attorney, Agent, or Firm* — Tucker Ellis LLP

(57) ABSTRACT

A braking controller and method in a towing vehicle towing one or more towed vehicles as a combination vehicle provides brake control of the one or more towed vehicles based on a level of braking force applied to the towing vehicle. A non-enhanced braking mode applies a first level of braking force to the towed vehicles in a predetermined reduced proportion relative to the level of braking force applied to the towing vehicle, and an enhanced braking mode applies a second level of braking force to the towed vehicles greater than the first level of braking force. The enhanced braking mode strategy is used unless trailer capability information reported by one or more the trailers fails to match against expected trailer capability information.

35 Claims, 26 Drawing Sheets

(51) Int. Cl.
  *B60D 1/24*   (2006.01)
  *B60D 1/62*   (2006.01)
  *B60T 7/20*   (2006.01)
  *G08G 1/00*   (2006.01)
  *B60T 8/32*   (2006.01)
  *G01B 21/06*   (2006.01)

(52) U.S. Cl.
  CPC .................. *B60T 7/20* (2013.01); *G08G 1/22* (2013.01); *B60T 8/323* (2013.01); *G01B 21/06* (2013.01)

(58) Field of Classification Search
  USPC .......................................................... 701/78
  See application file for complete search history.

(56) References Cited

U.S. PATENT DOCUMENTS

| | | |
|---|---|---|
| 4,180,223 A | 12/1979 | Amberg |
| 4,804,237 A | 2/1989 | Gee |
| 5,409,301 A | 4/1995 | Topfer |
| 5,920,128 A | 7/1999 | Hines |
| 5,986,544 A | 11/1999 | Kaisers |
| 6,068,352 A | 5/2000 | Kulkarni |
| 6,545,593 B2 | 4/2003 | DeWilde |
| 7,124,003 B1 | 10/2006 | West |
| 7,301,479 B2 | 11/2007 | Regan |
| 8,874,346 B2 | 10/2014 | Kontz |
| 9,290,203 B2 | 3/2016 | Lavoie |
| 9,632,507 B1 | 4/2017 | Korn |
| 9,738,125 B1 | 8/2017 | Brickley |
| 2001/0056544 A1 | 12/2001 | Walker |
| 2002/0095251 A1 | 7/2002 | Oh |
| 2002/0147538 A1 | 10/2002 | Marra |
| 2005/0278098 A1 | 12/2005 | Breed |
| 2006/0214506 A1 | 9/2006 | Albright et al. |
| 2007/0260384 A1* | 11/2007 | Romanchok ........... B60T 8/1708 701/70 |
| 2010/0222979 A1 | 9/2010 | Culbert |
| 2013/0085649 A1* | 4/2013 | Matoy ................... B60T 8/1708 701/70 |
| 2013/0124059 A1 | 5/2013 | Funder |
| 2013/0151088 A1 | 6/2013 | Ricci |
| 2014/0180553 A1* | 6/2014 | Eckert ................... B60T 8/1766 701/70 |
| 2014/0226010 A1* | 8/2014 | Molin .................... G06Q 10/06 348/148 |
| 2016/0114772 A1 | 4/2016 | Vietor |
| 2016/0357188 A1 | 12/2016 | Ansari |
| 2017/0235307 A1 | 8/2017 | Asakura |
| 2018/0154874 A1 | 6/2018 | Kulkarni |
| 2018/0186381 A1 | 7/2018 | Erlien |
| 2018/0190119 A1 | 7/2018 | Miller |
| 2018/0210463 A1 | 7/2018 | Switkes |

FOREIGN PATENT DOCUMENTS

| | | |
|---|---|---|
| JP | H0463751 A | 2/1992 |
| JP | H0463759 A | 2/1992 |
| JP | H07257345 A | 10/1995 |
| JP | H09249047 A | 9/1997 |
| WO | 03022650 A1 | 3/2003 |

OTHER PUBLICATIONS

International Search Report and Written Opinion from correlating International Application No. PCT/US2018/050967, dated Jan. 18, 2019; 44 pages.
U.S. Office Action from corresponding U.S. Appl. No. 15/706,404, dated Mar. 22, 2019, 47 pages.
Notice of allowance for related U.S. Appl. No. 15/706,404, dated Jul. 11, 2019.
International Search Report and Written Opinion for related international application No. PCT/US2019/043277, dated Nov. 4, 2019.
International Search Report and Written Opinion for related international application No. PCT/US2019/043285, dated Nov. 4, 2019.
Notice of allowance for related U.S. Appl. No. 16/045,490, dated Sep. 18, 2019.

* cited by examiner

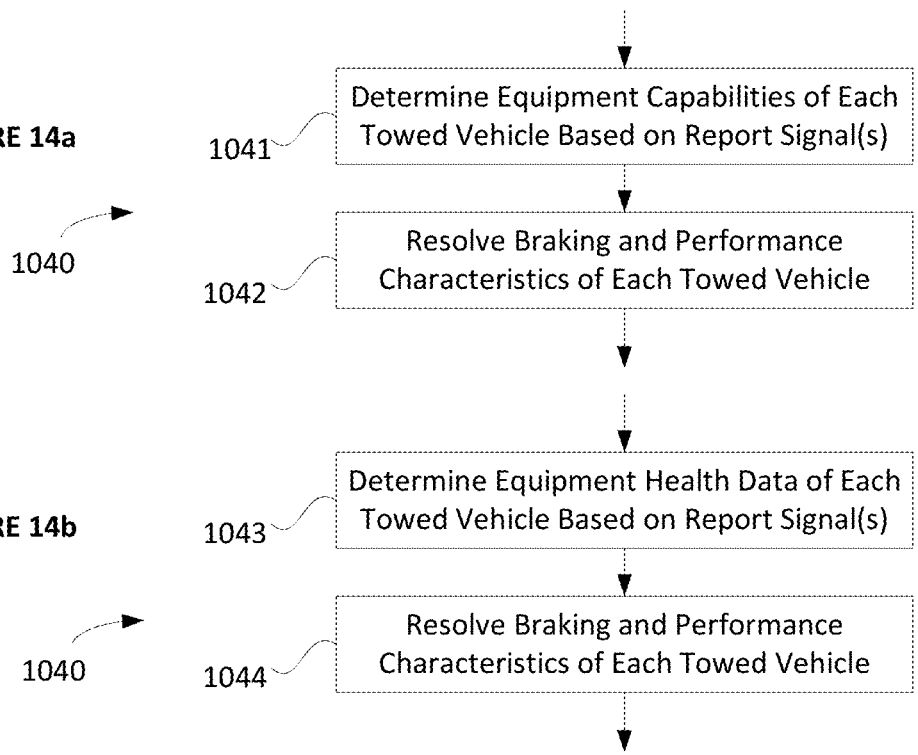

BRAKING CONTROLLER AND METHOD USING VERIFICATION OF REPORTED TRAILER CAPABILITIES

CROSS REFERENCE TO RELATED APPLICATIONS

This application is related to U.S. application Ser. No. 15/706,404, filed Sep. 15, 2017, entitled: BRAKING CONTROLLER AND METHOD USING VERIFICATION OF REPORTED TRAILER CAPABILITIES, the contents of which is incorporated herein by reference in its entirety.

TECHNICAL FIELD

The embodiments herein relate generally to highway vehicle brake control. More specifically, particular embodiments relate to a towing vehicle controller on a towing vehicle such as a commercial vehicle tractor, that controls the air brakes, based on a verification of reported capabilities of one or more towed vehicles, such as one or more commercial vehicle trailers, and a method of providing brake control to the one or more towed vehicles.

BACKGROUND

It is known that two or more vehicles moving along a roadway can cooperate as a road train or a "platoon" for mutually providing various efficiency benefits to the vehicles within the platoon. A typical vehicle platoon includes a leader vehicle and one or more follower vehicles arranged serially along a single roadway lane. Larger platoons can involve many follower vehicles for spanning multiple lanes thereby providing enhanced efficiency to more vehicles. However, ensuring the safety of both the platooned vehicles as well as of the other non-platooning vehicles on the roadway usually dictates the short single lane platoon incarnation.

The aerodynamic geometry of a group of vehicles arranged in a platoon provides wind resistance loss benefits superior to the aggregated individual wind resistance losses of the vehicles when travelling separately. A maximum aerodynamic benefit and resultant fuel savings is realized by the vehicles maintaining a small inter-vehicle distance or spacing in terms of reduced energy consumption. However, holding a tight head-to-tail distance or spacing between platooned vehicles requires that careful attention be paid to various functional or environmental and operational characteristics and capabilities of the vehicles and other external conditions including for example the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platooning vehicles follow each other on the roadway in close proximity to each other and often at highway speeds as explained above, and for this they typically use a Radar to control the inter-vehicle distance(s). For emergency braking situations such as Autonomous Emergency Braking (AEB) events for example, forward-directed cameras and/or other sensor(s) on a following vehicle may detect the actuation by a forward vehicle of a rearward facing brake light so that appropriate emergency stopping or other actions can suitably be initiated.

Platoons that operate on public roadways, however, sometimes encounter conditions that require more complicated platoon arrangements and brake monitoring and platooning control and maintenance operations. The close distance between the platooning vehicles poses a risk when the lead vehicle has to decelerate in an emergency situation such as might be required by stopping forward traffic. Therefore in the interest of protecting the platooning vehicles from inadvertent collision with each other, a particular platoon order or arrangement has been devised. More particularly, many platoons are ordered so that the platoon vehicle that is least capable of deceleration is placed at the front of the platoon. This helps to mitigate the chance that the one or more platoon follower vehicles will be unable to adequately decelerate in order to avoid a collision with the platoon leader vehicle. In this platoon topology, the platooning vehicle having the lightest or least braking capabilities or parameters is located at the front of the platoon chain, the vehicle having the highest braking capabilities or parameters is located at the back or rear of the platoon chain, and any one or more intermediate vehicles are arranged from front to back in an order of increasing braking capabilities or parameters. This platoon topology also gives each rearward or following vehicle more time gap for braking in turn relative to the next immediately forward or leading vehicle.

In roadway vehicles, however, braking efficiency is affected by many factors such as brake temperature, brake type, burnishing, vehicle weight, number of tires, tire wear, vehicle loading, road surface type and weather conditions. In addition, the braking efficiency of any vehicle can also change over time, and also can change differently for each vehicle. One or more changes in braking capabilities and any other braking performance characteristics of a first vehicle of a set of platooning vehicles does not necessarily imply that any of the other vehicles of the set of platooning vehicles are experiencing the same one or more changes. That is, one or more changes in braking capabilities of any single vehicle in a platoon cannot reliably be imputed any of the other vehicles of the platoon. This makes management of inter-vehicle gap distances between the platooning vehicles dynamic and therefore more difficult.

Platooning vehicles may be of a single body form such as a panel truck or of a combination vehicle form. A combination vehicle typically comprises a towing vehicle such as a commercial vehicle tractor towing one or more towed vehicles such as one or more commercial vehicle trailers. Currently, towing vehicle safety systems use a "non-enhanced" braking mode when responding to platoon brake signals because ABS functionality of the one or more towed vehicles is indeterminate. The non-enhanced braking mode pulses the braking signal from the towing vehicle of the combination vehicle to the one or more towed vehicles in order to prevent potential instability. In general, the non-enhanced braking mode applies a first level of braking force to the one or more towed vehicles in a predetermined reduced proportion relative to the level of braking force applied to the towing vehicle by the towing vehicle's platoon safety system.

Use of the non-enhanced braking mode as a default braking mode of operation when the braking capabilities of the one or more towed vehicles is indeterminate or when functional ABS cannot be established may present a problem while platooning, however, because it might sometimes be necessary and/or desirable for a following vehicle to apply more braking force to the one or more towed vehicles than the first level of braking force of the non-enhanced mode would allow or otherwise permit. This situation could potentially result in an unnecessary collision between the vehicles when the one or more towed vehicles of the combination vehicle are in fact capable of safely responding to braking forces above the first level of the non-enhanced mode even though their functional ABS is indeterminate or cannot be established by the towed vehicle. In some cases, the one or more towed vehicles of the combination vehicle might be capable of safely responding to braking forces above the first level of the non-enhanced mode for short periods of time thereby avoiding a collision with an adjacent platooning vehicle, even though their functional ABS is indeterminate or cannot be established by the towed vehicle.

Given the above, therefore, it is highly desirable to provide a system and method for resolving the capabilities of the one or more towed vehicles so that either the non-enhanced or the enhanced braking modes can be implemented. In particular, it is desirable to provide a system and method for resolving the capabilities of the one or more towed vehicles based on a verification of capabilities reported by the towed vehicles relative to an expected capabilities set or state.

It would be desirable to provide a system and method to selectively enhance the level braking of the one or more towed vehicles of a combination vehicle as may be necessary and/or desired above the first level of braking that would be available in the non-enhanced braking mode.

It would further be desirable to provide a system and method to selectively enhance the braking of the one or more towed vehicles to effect in certain circumstances an "enhanced" braking mode when the braking capabilities of the one or more towed vehicles can be determined or otherwise verified, wherein the enhanced braking mode applies a second level of braking force to the one or more towed vehicles of the combination vehicle greater than the first level of braking force that would otherwise be applied in the non-enhanced braking mode.

It would still further be desirable to provide a system and method to selectively enhance the trailer braking to effect the enhanced braking mode when the braking and/or other functional capabilities of the one or more towed vehicles as reported by the one or more towed vehicles can be verified relative to an expected set of braking and/or other functional capabilities.

It would still yet further be desirable to provide a system and method to selectively enhance the trailer braking to effect the enhanced braking mode when the braking and/or other functional capabilities of the one or more towed vehicles as reported by the one or more towed vehicles can be verified relative to an expected set of braking and/or other functional capabilities received from an operator of the towing vehicle, and to effect the non-enhanced braking mode when the braking and/or other functional capabilities of the one or more towed vehicles as reported by the one or more towed vehicles cannot be verified relative to the expected set of braking and/or other functional capabilities received from the operator of the towing vehicle.

It would be desirable to receive the expected set of braking and/or other functional capabilities from the operator of the towing vehicle by a human interface circuit operatively coupled with the towing vehicle. It would be desirable in particular for the human interface circuit to include human interactive components such as for example one or more of a touch screen disposed in or operatively coupled with the towing vehicle of the combination vehicle, a dashboard console disposed in the towing vehicle of the combination vehicle, a headliner console disposed in the towing vehicle of the combination vehicle, and/or a cellular phone interface disposed in or operatively coupled with the towing vehicle of the combination vehicle.

It would still further yet be desirable to provide a system and method to selectively enhance the trailer braking to effect the enhanced braking mode when the braking and/or other functional capabilities of the one or more towed vehicles as reported by the one or more towed vehicles can be verified relative to an expected set of braking and/or other functional capabilities received by the towing vehicle from an associated source other than the operator, and to effect the non-enhanced braking mode when the braking and/or other functional capabilities of the one or more towed vehicles as reported by the one or more towed vehicles cannot be verified relative to the expected set of braking and/or other functional capabilities received by the towing vehicle from the associated source other than the operator.

It would be desirable to receive the expected set of braking and/or other functional capabilities from associated source other than the operator of the towing vehicle by a wireless communication circuit operatively coupled with the towing vehicle. It would be desirable in particular for the wireless communication circuit to be one or more of a wireless networking WiFi communication circuit receiving wireless WiFi signals, a wireless Bluetooth communication circuit receiving wireless Bluetooth signals, a wireless dedicated short range communications (DSRC) communication circuit receiving wireless DSRC signals, an LDP433 communication circuit receiving wireless LDP433 signals, a radio frequency (RF) communication circuit receiving RF signals, a wireless cellular communication circuit receiving wireless cellular communication signals, a wireless satellite communication circuit receiving wireless satellite communication signals, one or more associated camera devices, one or more radar devices, and/or one or more Light Detection and Ranging (LIDAR) sensor devices.

SUMMARY OF THE EXAMPLE EMBODIMENTS

The embodiments herein provide for new and improved systems and methods for providing brake control of one or more towed vehicles of a combination vehicle.

In the embodiments herein, a brake controller of a towing vehicle towing one or more towed vehicles as a combination vehicle provides brake control to the one or more towed vehicles based on a level of braking force applied to the towing vehicle and on other conditions, and a brake control method provides the brake control to the one or more towed vehicles based on the level of braking force applied to the towing vehicle and on the other conditions. Although the embodiments will be described with reference to selected particular brake controller and trailer braking strategy examples implemented by overland platooning highway vehicles, it is to be appreciated that the claimed invention is also amenable to other applications and can be equivalently extended to other embodiments and environments.

The embodiments herein provide in particular a braking controller and method in a towing vehicle towing one or more towed vehicles as a combination vehicle providing brake control of the one or more towed vehicles based on a level of braking force applied to the towing vehicle. A non-enhanced braking mode applies a first level of braking force to the towed vehicles in a predetermined reduced proportion relative to the level of braking force applied to the towing vehicle, and an enhanced braking mode applies a second level of braking force to the towed vehicles greater than the first level of braking force.

In one form, control logic stored in a non-transient memory device is executable by a processor to determine the braking mode of the one or more towed vehicles of the combination vehicle as one of: the non-enhanced braking mode in accordance with a comparison between first combination vehicle configuration data provided by an operator of the combination vehicle and second combination vehicle configuration data provided by the towed vehicles to determine a comparison result between the first combination vehicle configuration data and the second combination vehicle configuration data, and determine the braking mode of the one or more towed vehicles as the enhanced braking mode in accordance with a matching result of the comparison or the non-enhanced braking mode in accordance with a non-matching result of the comparison different than the first result of the comparison.

In another form, control logic stored in a non-transient memory device is executable by a processor to determine the braking mode of the one or more towed vehicles of the combination vehicle as one of: the non-enhanced braking mode in accordance with a comparison between first combination vehicle configuration data provided by an associated source other than the operator of the combination vehicle and second combination vehicle configuration data provided by the towed vehicles to determine a comparison result between the first combination vehicle configuration data and the second combination vehicle configuration data, and determine the braking mode of the one or more towed vehicles as the enhanced braking mode in accordance with a matching result of the comparison or the non-enhanced braking mode in accordance with a non-matching result of the comparison different than the first result of the comparison.

In accordance with an example embodiment, a braking controller is provided for use in an associated towing vehicle towing one or more towed vehicles as a combination vehicle. The braking controller of the example embodiment includes a processor, a controller first automatic configuration input operatively coupled with the processor, a controller second automatic configuration input operatively coupled with the processor, a non-transient memory device operatively coupled with the processor, and control logic stored in the non-transient memory.

The controller first automatic configuration input of the example embodiment receives a first automatic combination vehicle configuration signal comprising first combination vehicle configuration data representative of first combination vehicle configuration information provided by an associated source in operative communication with the associated towing vehicle. The controller second automatic configuration input of the example embodiment receives a second automatic combination vehicle configuration signal comprising second combination vehicle configuration data representative of second combination vehicle configuration information provided by the one or more towed vehicles of the combination vehicle.

The first and second combination vehicle configuration data is stored in the non-transient memory device. The control logic is further stored in the non-transient memory device and is executable by the processor to perform a comparison between the first combination vehicle configuration data and the second combination vehicle configuration data to determine a comparison result, and determine a braking mode of the one or more towed vehicles of the combination vehicle as a one of an enhanced braking mode in accordance with a first comparison result of the comparison or a non-enhanced braking mode in accordance with a second comparison result of the comparison, the first comparison result being different than the second comparison.

In the example embodiment, the non-enhanced braking mode applies a first level of braking force to the one or more towed vehicles of the combination vehicle in a predetermined reduced proportion relative to a commanded level of braking force applied to the towing vehicle of the combination vehicle. Further in the example embodiment, the enhanced braking mode applies a second level of braking force to the one or more towed vehicles of the combination vehicle greater than the first level of braking force.

In accordance with a further example embodiment, a braking controller is provided for use in an associated towing vehicle towing one or more towed vehicles as a combination vehicle. The braking controller of the example embodiment includes a processor means, a controller first automatic configuration input means operatively coupled with the processor means, a controller second automatic configuration input means operatively coupled with the processor means, memory means operatively coupled with the processor, and control logic means operatively coupled with the memory means. The braking controller may comprise a general-purpose computer configured with one or more stored programs which when executed cause performing the functions described herein, or a special-purpose computer with digital logic that is configured to execute the functions, or digital logic that is used in other computing devices. While the figures include lines that indicate various devices and/or modules being communicatively coupled, each of the computers, devices, modules, logic, storage, and configurations may be communicatively coupled with each other.

The term "processor means" as used herein refers to any microprocessor, discrete logic (e.g., ASIC), analog circuit, digital circuit, programmed logic device, memory device containing instructions, and so on. The term "processor means" also refers to "logic" which may include one or more gates, combinations of gates, other circuit components, hardware, firmware, software in execution on a machine, and/or combinations of each to perform a function(s) or an action(s), and/or to cause a function or action from another logic, method, and/or system, a software controlled microprocessor, a discrete logic (e.g., ASIC), an analog circuit, a digital circuit, a programmed logic device, a memory device containing instructions, and so on. The term "memory means" as used herein refers to any non-transitory media that participates in storing data and/or in providing instructions to the processor means for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

The controller first automatic configuration input means includes any device and/or devices capable of receiving a first automatic combination vehicle configuration signal comprising first combination vehicle configuration data representative of first combination vehicle configuration information provided by an associated source in operative communication with the associated towing vehicle.

The controller second automatic configuration input means includes any device and/or devices capable of receiving a second automatic combination vehicle configuration signal comprising second combination vehicle configuration data representative of second combination vehicle configuration information provided by the one or more towed vehicles of the combination vehicle.

In the example embodiment, the memory means operatively coupled with the processor means stores the first and second combination vehicle configuration data, and the control logic means operatively coupled with the memory means is executable by the processor means to perform a comparison between the first combination vehicle configuration data and the second combination vehicle configuration data to determine a comparison result between the first combination vehicle configuration data and the second combination vehicle configuration data.

The control logic means is further executable by the processor means to determine a braking mode of the one or more towed vehicles of the combination vehicle as a one of an enhanced braking mode in accordance with a first result of the comparison or a non-enhanced braking mode in accordance with a second result of the comparison different than the first result of the comparison. The non-enhanced braking mode applies a first level of braking force to the one or more towed vehicles of the combination vehicle in a predetermined reduced proportion relative to a commanded level of braking force applied to the towing vehicle of the combination vehicle. The enhanced braking mode applies a second level of braking force to the one or more towed vehicles of the combination vehicle greater than the first level of braking force.

In accordance with yet a further example embodiment, a braking control method is provided for use with an associated towing vehicle towing one or more towed vehicles as a combination vehicle. The braking control method includes receiving at a controller first automatic configuration input operatively coupled with a processor a first automatic combination vehicle configuration signal comprising first combination vehicle configuration data representative of first combination vehicle configuration information provided by an associated source in operative communication with the associated towing vehicle.

The braking control method further includes receiving at a controller second automatic configuration input operatively coupled with the processor a second automatic combination vehicle configuration signal comprising second combination vehicle configuration data representative of second combination vehicle configuration information provided by the one or more towed vehicles of the combination vehicle.

The braking control method further includes storing the first and second combination vehicle configuration data in a memory operatively coupled with the processor, and performing, by control logic operatively coupled with the memory and executable by the processor, a comparison between the first combination vehicle configuration data and the second combination vehicle configuration data to determine a comparison result. The control logic determines a braking mode of the one or more towed vehicles of the combination vehicle as a one of an enhanced braking mode in accordance with a first comparison result of the comparison or a non-enhanced braking mode in accordance with a second comparison result of the comparison, the first comparison result being different than the second comparison.

The non-enhanced braking mode applies a first level of braking force to the one or more towed vehicles of the combination vehicle in a predetermined reduced proportion relative to a commanded level of braking force applied to the towing vehicle of the combination vehicle, and the enhanced braking mode applies a second level of braking force to the one or more towed vehicles of the combination vehicle greater than the first level of braking force.

The embodiments herein further provide controlled transition between braking modes of operation ranging from a non-enhanced braking mode of operation applying modulated full brake pressure of the towing vehicle to the towed vehicle, and an enhanced braking mode of operation applying unmodulated full brake pressure of the towing vehicle to the towed vehicle.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 14a and 14b illustrate alternative details of the step of the control logic determining the capabilities of the towed vehicles.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
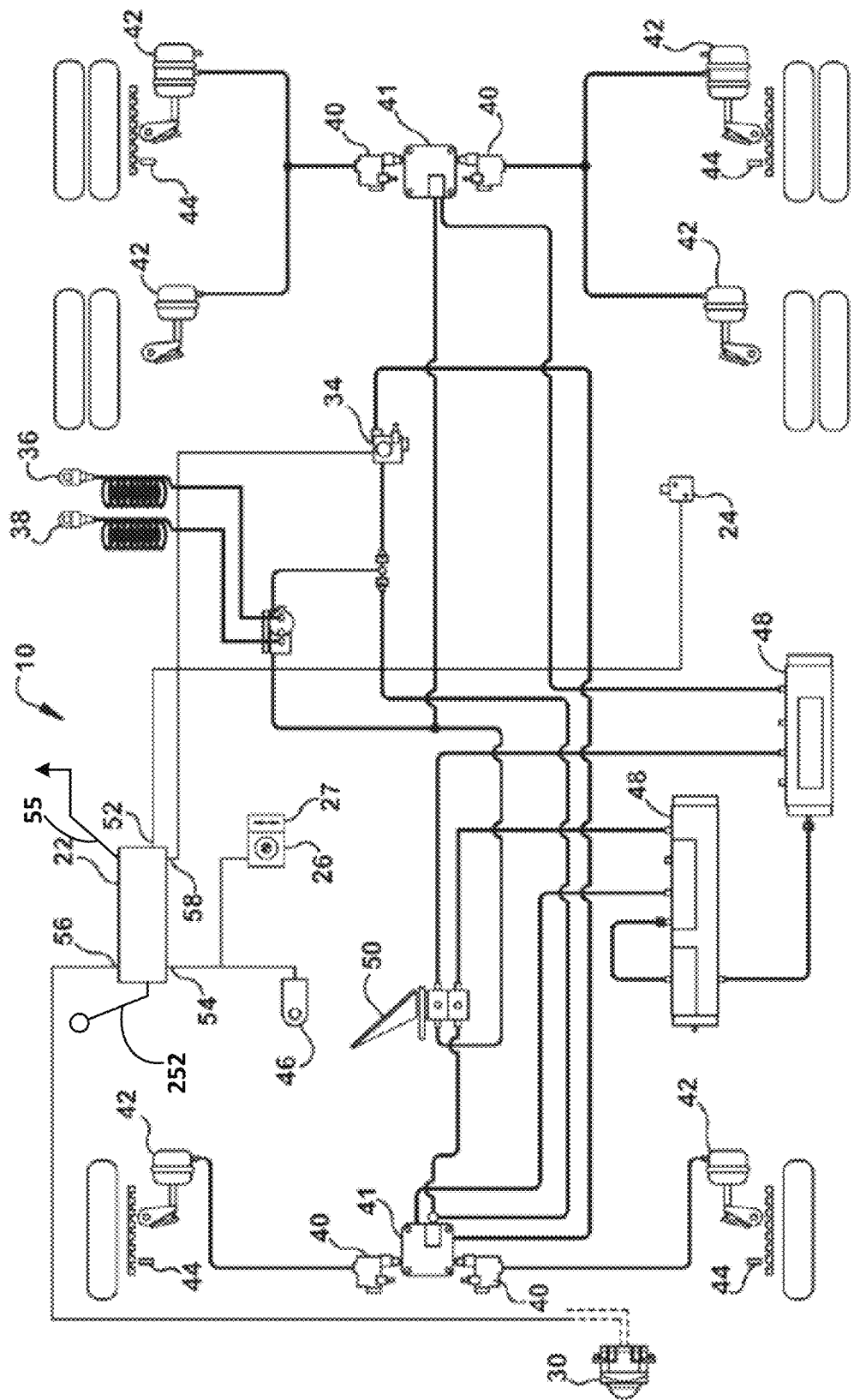
FIG. 1 illustrates a schematic representation of a braking system on a towing vehicle including a towing vehicle controller in accordance with an example embodiment.

Referring now to the drawings, wherein the showings are for the purpose of illustrating the example embodiments providing braking strategies for towing and towed vehicles while travelling on roadways and for only, and not for purposes of limiting the same, FIG. 1 illustrates an air brake system 10 of a towing vehicle, or tractor, by way of an example application. The system 10 includes an electronic towing vehicle controller 22 with inputs for electrically connecting to, either directly or through a vehicle serial communication bus, at least four modulators 40, at least four wheel speed sensors 44, at least two traction relay valves 41, a trailer pressure control device 34, a steering angle sensor 46, a lateral acceleration sensor 27, a yaw rate sensor 26, and a load sensor 24. The pneumatic portion of the tractor air brake system 10 includes at least four brake actuators 42, at least two reservoirs 48, and an operator actuated brake pedal 50. Each of the at least four wheel speed sensors 44 communicates the individual wheel speeds to the towing vehicle controller 22 for use in antilock braking system (ABS), automatic slip regulation (ASR), and electronic stability control (ESC) algorithms. Each of the at least four modulators 40 is connected pneumatically to one of the at least two traction relay valves 41 and to one of the at least four brake actuators 42. When equipped with ESC, the towing vehicle controller 22 is capable of actuating the tractor brakes independently of the operator in order to maintain vehicle stability. It is to be appreciated that, in accordance with the example embodiments, the towing vehicle controller 22 is also capable of actuating the tractor brakes independently of the operator in order to react to various commands from other platooning vehicles and to react to forward collision warning event data as may be necessary and/or desired.

The tractor air brake system 10 is pneumatically connected to a towed vehicle, or trailer, air brake system (not shown) through a trailer control connection 36 and a trailer supply connection 38. The trailer supply connection 38 is pneumatically connected to the reservoirs 48 on the tractor through a control valve (not shown). The trailer control connection 36 is pneumatically connected to the trailer pressure control device 34. The trailer pressure control device 34 is typically an electro-pneumatic valve, for example, a Bendix® M-32™ modulator. The trailer pressure control device 34 receives a brake control transmission signal from an output 58 of the towing vehicle controller 22 and converts the brake control transmission signal to a control air signal for the towed vehicle. Through the trailer pressure control device 34, the towing vehicle controller 22 of the tractor air brake system 10 is able to control the control air signal supplied to the trailer brake system. In particular, in the example embodiment, the towing vehicle controller 22 of the tractor air brake system 10 is able to control the control air signal supplied to the trailer brake system through the trailer pressure control device 34 for effecting the enhanced and the non-enhanced brake control strategies and for effecting transitions from the platooning operation in ways to be described below in greater detail.

The towing vehicle controller 22 receives a signal indicative of the combined load of the tractor and the coupled trailer from the load sensor 24 at a controller input 52. In one embodiment, the load sensor 24 is a pressure sensor connected to a tractor air suspension air bag. As the pressure in the air bag increases, the load signal value indicative of the combined load increases and, therefore, the load as determined by the towing vehicle controller 22 from the load signal increases. Other means may be used to determine the tractor-trailer load, such as on board scales, linear displacement sensors on the tractor chassis or vehicle mass estimation based on engine torque data. It is understood that the signal indicative of the tractor-trailer load may be received either directly through a controller input or through a vehicle serial communications bus.

The towing vehicle controller 22 also receives a signal or signals concerning a stability condition of the tractor, such as, for example, a yaw rate signal and a lateral acceleration signal from a yaw rate sensor 26 and lateral acceleration sensor 27, respectively. The yaw rate sensor 26 and the lateral acceleration sensor 27 are mounted on the tractor and may be discrete or packaged as a combination sensor, such as the Bendix® YA-S60™ sensor. The yaw rate sensor 26 and lateral acceleration sensor 27 may communicate directly with an input 54 at the towing vehicle controller 22 or over the vehicle serial communication bus. Other sensors may be used to determine a stability condition at a tractor, including the steering angle sensor 46 or the one or more wheel speed sensors 44. The towing vehicle controller 22 is able to use at least the load signal and stability condition signals to enhance the tractor and trailer braking response when the operator actuates the brake pedal 50, independently of the operator, or independently and in combination with actuation of the brake pedal 50 by the operator.

In many situations, the tractor may be equipped with an automatic cruise control (ACC) system. In such cases, the towing vehicle controller 22 also receives information from a radar sensor 30 when the ACC system is activated by the operator. The radar sensor 30 is mounted on the tractor or towing vehicle. The information from the radar sensor 30 is received by an input 56 on the towing vehicle controller 22 or over the vehicle serial communication bus. The information transmitted by the radar sensor 30 typically includes automated deceleration requests. A deceleration signal is created in response to the automated deceleration request when the ACC system determines the tractor needs to decelerate in order to maintain a certain following distance between the tractor and a target vehicle. The towing vehicle controller 22 typically responds to a deceleration signal first by de-throttling the engine, then activating a vehicle retarder. Lastly, the towing vehicle controller 22 applies the individual wheel end brakes on the tractor and sends the brake control transmission signal to the trailer pressure control device 34. If the vehicle is equipped with a Collision Mitigation System, then the towing vehicle controller 22 is continuously receiving and responding to deceleration signals from the radar sensor 30, first by alerting the operator of the reduced distance between the towing vehicle and the target object and then by applying the towing vehicle and towed vehicle brakes.

Similarly and in accordance with an example embodiment, the tractor or towing vehicle may be equipped with an automatic platooning control (APC) system. In such cases, the towing vehicle controller 22 also receives information from one or more other platooning vehicle platoon members via one or more radio frequency (RF) antennas 252 for wireless communication of platoon control and command data, GPS data, and the like when the APC system is activated by the operator. The one or more antennas 252 are mounted on the tractor or towing vehicle. The information from the one or more radio frequency (RF) antennas 252 is received by an input 55 on the towing vehicle controller 22 or over the vehicle serial communication bus. The information received by the one or more radio frequency (RF) antennas 252 includes, in example embodiments herein, towed vehicle braking capability data communicated to the controller 22 from an associated source other than the operator and/or indirectly from the one or more towed vehicles such as through an intermediary cellular, satellite or other similar infrastructure. The information received by the one or more radio frequency (RF) antennas 252 may typically also include automated deceleration requests. A deceleration signal is created in response to the automated deceleration request when the APC system determines that the automated deceleration request is valid and that the tractor needs to decelerate in order to maintain a certain following distance between the tractor and a target vehicle transmitting the automated deceleration request to the tractor. The towing vehicle controller 22 typically responds to a deceleration signal first by de-throttling the engine, then activating a vehicle retarder. Lastly, the towing vehicle controller 22 applies the individual wheel brakes on the tractor and sends the brake control transmission signal to the trailer pressure control device 34. If the vehicle is equipped with a Collision Mitigation System, then the towing vehicle controller 22 is continuously receiving and responding to automated deceleration request from the target vehicle, first by alerting the operator of the automated deceleration request reduced distance between the towing vehicle and the target object and then by applying the towing vehicle and towed vehicle brakes.

In the example embodiments herein, the towing vehicle controller 22 selectively applies the towed vehicle brakes commensurate with a reduced brake level as applied to the towing vehicle and in accordance with capabilities and dynamic performance data related to the towing and towed vehicle combination. In further example embodiments herein, the towing vehicle controller 22 selectively applies the towed vehicle brakes commensurate with or the same as the brake level applied to the towing vehicle responsive to receiving the automated deceleration request from the target vehicle and in accordance with capabilities and dynamic performance data related to the towing and towed vehicle combination. In further example embodiments, the towing vehicle controller 22 selectively applies the towed vehicle brakes commensurate with or the same as the brake level applied to the towing vehicle responsive to receiving the automated deceleration request from the target vehicle and in order to maintain a predetermined minimum distance between the towing vehicle and the target object.

In the example embodiments herein, a non-enhanced braking mode applies a first level of braking force to the one or more towed vehicles in a predetermined reduced proportion relative to the level of braking force applied to the towing vehicle. Further in the example embodiments herein, an enhanced braking mode applies a second level of braking force to the one or more towed vehicles greater than the first level of braking force. The controller determines the conditions for each of the modes, and selects the appropriate braking mode as between the enhanced and non-enhanced modes for realizing highly efficient braking of the combination vehicle for superior safety and stopping effectiveness.

Figure 2:
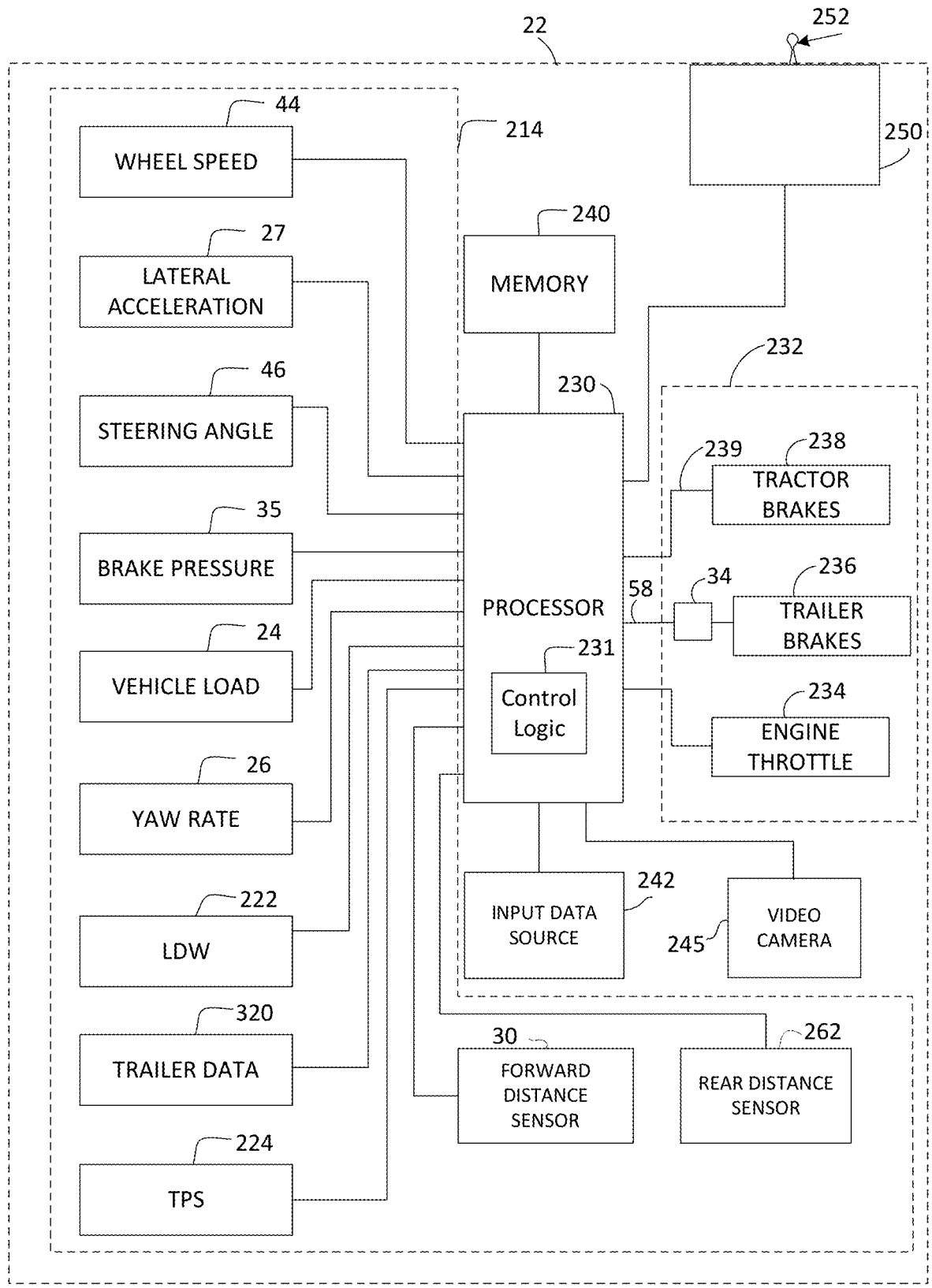
FIG. 2 is a schematic block diagram depiction that illustrates details of the towing vehicle controller of FIG. 1 in accordance with an example embodiment.

FIG. 2 is a schematic block diagram depiction that illustrates details of the towing vehicle controller 22 of FIG. 1 in accordance with an example embodiment. According to principles of the example embodiment as illustrated, the towing vehicle controller 22 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the towing vehicle controller 22 may include one or more devices or systems 214 for providing input data indicative of one or more operating parameters or one or more conditions of a commercial vehicle. For example, the devices 214 may be one or more sensors, such as but not limited to, one or more wheel speed sensors 44, a lateral acceleration sensor 27, a steering angle sensor 46, a brake pressure sensor 34, a vehicle load sensor 24, a yaw rate sensor 26, a lane departure warning (LDW) sensor or system 222, and a tire pressure (TPMS) monitoring system 224. The towing vehicle controller 22 may also utilize additional devices or sensors in the exemplary embodiment including for example a forward distance sensor 30, and a rear distance sensor 262. Other sensors and/or actuators or energy generation devices or combinations thereof may be used of otherwise provided as well, and one or more devices or sensors may be combined into a single unit as may be necessary and/or desired.

The towing vehicle controller 22 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to a stored threshold value. The processor 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the processor 230 may generate and send the control signal to an engine electronic control unit or an actuating device to reduce the engine throttle 234 and slowing the vehicle down. Further, the processor 230 may send the control signal to a vehicle brake system to selectively engage the brakes. In the tractor-trailer arrangement of the example embodiment, the processor 230 may engage the brakes on one or more wheels of a trailer portion of the vehicle 236 via the trailer pressure control device 34 (FIG. 1), and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The processor 230 may also include a memory portion 240 for storing and accessing system information, such as for example the system control logic 231 and control tuning. The memory portion 240, however, may be separate from the processor 230. The sensors 214 and processor 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the processor 230 of the present invention. Therefore, many of the components to support the towing vehicle controller 22 of the present invention may be present in a vehicle equipped with the Bendix® ESP® system, thus, not requiring the installation of additional components. The towing vehicle controller 22, however, may utilize independently installed components if desired.

The towing vehicle controller 22 may also include a source of input data 242 indicative of a configuration/condition of a commercial vehicle. The processor 230 may sense or estimate the configuration/condition of the vehicle based on the input data, and may select a control tuning mode or sensitivity based on the vehicle configuration/condition. The processor 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the towing vehicle controller 22 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the processor 230 is operatively coupled with one or more video image capture devices shown in the example embodiment for simplicity and ease of illustration as a single video camera 245 representation of one or more physical video cameras disposed on the vehicle such as, for example, one video camera on each corner of the vehicle or one or more cameras mounted remotely and in operative communication with the controller 22.

Still yet further, the controller 22 may also include a transmitter/receiver (transceiver) module 250 such as, for example, a radio frequency (RF) transmitter including one or more antennas 252 for wireless communication of the automated deceleration requests, GPS data, one or more various vehicle configuration and/or condition data, or the like between the vehicles and one or more destinations such as, for example, to one or more wireless services (not shown) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 is operative to communicate the acquired data to the one or more receivers in a raw data form, that is without processing the data, in a processed form such as in a compressed form, in an encrypted form or both as may be necessary or desired. In this regard, the processor 230 may combine selected ones of the vehicle parameter data values into processed data representative of higher level vehicle condition data such as, for example, data from the lateral acceleration sensor 27 may be combined with the data from the steering angle sensor 26 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

A basic platoon includes a host or leader vehicle in traffic with a second or follower vehicle in accordance with the present disclosure. Typically, the follower vehicle travels proximate to the leader vehicle seriatim in an ordered platoon along a roadway. The leader vehicle is provided with an electronic control system 22 which includes data collection and communication module logic and brake monitoring and platooning control logic. Similarly, the follower vehicle is also provided with an electronic control system which includes data collection and communication module logic and brake monitoring and platooning control logic. In the example embodiments to be described herein, each of the two or more vehicles comprising the various platoons that will be described include the same or equivalent electronic control system 22, the same or equivalent data collection and communication module logic, and the same or equivalent brake monitoring and platooning control logic, although other control systems having the functionality to be described herein may equivalently be used as necessary or desired.

In the example embodiment illustrated, the towing vehicle controllers 22 of the respective vehicles of the platoon are configured for mutually communicating signals and exchanging data between each other and between their respective one or more towed vehicles, and also for communicating signals and exchanging data with various other communication systems including for example a remote wireless communication system and a remote satellite system. These remote systems can provide, for example, global position system (GPS) data to the vehicles as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to trailer braking strategies for platooning for inter-vehicle platoon distance and/or spacing management i.e. platoon ordering and spacing beneficially without the need to consult with or act under the direction of or in concert with the remote satellite system, the remote fleet management facility, a Network Operations Center (NOC), a Central Command Center (CCC), or the like.

In addition to the above, the towing vehicle controller 22 of each platooning vehicle operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication.

Operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles.

The towing vehicle controller 22 of FIG. 2 is suitable for executing embodiments of one or more software systems or modules that perform trailer brake strategies and trailer braking control methods according to the subject application. The example towing vehicle controller 22 may include a bus or other communication mechanism for communicating information, and a processor 230 coupled with the bus for processing information. The computer system includes a main memory 240, such as random access memory (RAM) or other dynamic storage device for storing information and instructions to be executed by the processor 230, and read only memory (ROM) or other static storage device for storing static information and instructions for the processor 230. Other storage devices may also suitably be provided for storing information and instructions as necessary or desired.

Instructions may be read into the main memory 240 from another computer-readable medium, such as another storage device of via the transceiver 250. Execution of the sequences of instructions contained in main memory 240 causes the processor 230 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

Figure 3A:
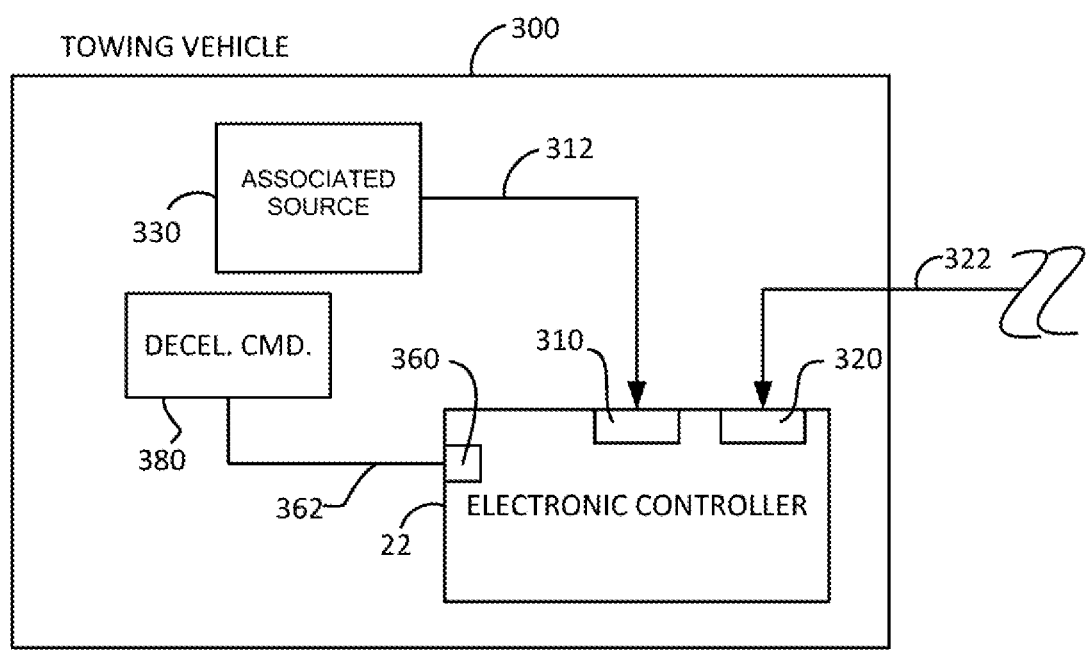
FIG. 3a is a functional block diagram illustrating the towing vehicle controller of FIG. 1 applied in a towing vehicle of a towing and towed vehicle combination in accordance with an embodiment using manual input of trailer data obtained from an operator of the towing vehicle.

FIG. 3a is a functional block diagram illustrating the towing vehicle controller 22 of FIG. 1 applied in a towing vehicle 300 of a towing and towed vehicle combination in accordance with an embodiment using manual input of trailer data obtained from an operator of the towing vehicle. In accordance with the embodiments herein, a braking controller 22 is provided for use in an associated towing vehicle 300 towing one or more towed vehicles as a combination vehicle. The braking controller 22 in the example embodiment shown in FIG. 3a includes a processor 230 (FIG. 2), a controller manual configuration input 310 operatively coupled with the processor, a controller automatic configuration input 320 operatively coupled with the processor, a non-transient memory device 240 (FIG. 2) operatively coupled with the processor, and control logic 231 (FIG. 2) stored in the non-transient memory device and executable by the processor to perform braking control of the one or more vehicles of the combination vehicle.

The controller manual configuration input 310 is adapted to receive a manual combination vehicle configuration signal 312 comprising first combination vehicle configuration data representative of first combination vehicle configuration information. Preferably, the first combination vehicle configuration data representative of first combination vehicle configuration information is provided by an associated operator of the associated towing vehicle using a human interface device 330 such as a touch screen or the like positioned in the cab of the towing vehicle 300.

In the embodiment, the controller automatic configuration input 320 is adapted to receive an automatic combination vehicle configuration signal 322 comprising second combination vehicle configuration data representative of second combination vehicle configuration information. Preferably, the second combination vehicle configuration data representative of second combination vehicle configuration information is provided by the one or more towed vehicles of the combination vehicle using one or more suitable interfaces to be described in greater detail below.

The non-transient memory device 240 operatively coupled with the processor stores the first and second combination vehicle configuration data received from the controller manual 312 and automatic 322 configuration inputs, and the control logic 231 stored in the non-transient memory device is executable by the processor 230 to perform a comparison between the first combination vehicle configuration data and the second combination vehicle configuration data to determine a comparison result between the first combination vehicle configuration data and the second combination vehicle configuration data. In this example embodiment, a braking mode of the one or more towed vehicles of the combination vehicle is determined as a one of an enhanced braking mode in accordance with a first result of the comparison or a non-enhanced braking mode in accordance with a second result of the comparison different than the first result of the comparison.

It is to be appreciated that, as will be described below in connection with FIG. 4, the non-enhanced braking mode applies a first level of braking force to the one or more towed vehicles of the combination vehicle in a predetermined reduced proportion relative to a commanded level of braking force applied to the towing vehicle of the combination vehicle, and that the enhanced braking mode applies a second level of braking force to the one or more towed vehicles of the combination vehicle greater than the first level of braking force.

In a preferred form, the braking controller manual configuration input 310 comprises a human interface circuit 330 operatively coupled with the processor. During use of the system, the human interface circuit 330 receives from the associated operator of the associated towing vehicle 300, the manual combination vehicle configuration signal 312 comprising the first combination vehicle configuration data representative of the first combination vehicle configuration information.

The human interface circuit 330 of the braking controller 22 according to the embodiment described may include one or more of a touch screen disposed in the towing vehicle of the combination vehicle, a dashboard console disposed in the towing vehicle of the combination vehicle, a headliner console disposed in the towing vehicle of the combination vehicle, and/or a cellular phone interface disposed in the towing vehicle of the combination vehicle for communication with a cellular phone in operable proximity relative to the cellular phone interface.

Figure 3B:
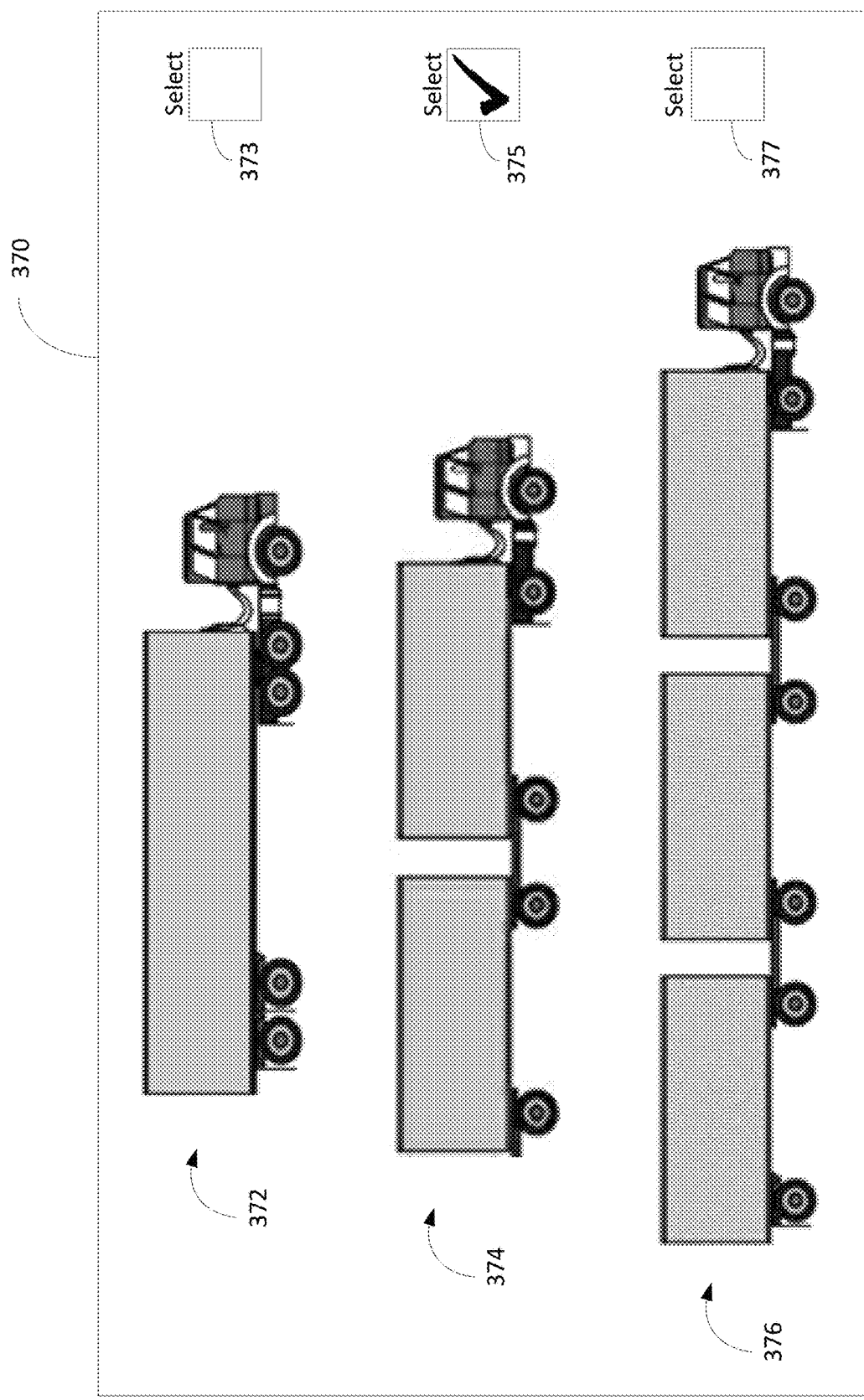
FIG. 3b is an example graphical representation of an image presented to a human operator on a human interface circuit of the towing vehicle braking controller according to an example embodiment.

FIG. 3b is an example graphical representation of an image 370 presented to the human operator on the human interface circuit 330 of the braking controller 22 according to an example embodiment. As shown, for example, in order to assist the operator in easily providing trailer capability data to the controller 22 without the need to input a large quantity of complicated data, the human interface circuit 330 may display an image 370 including a set of representative combination vehicles for selection by the operator. For example, the human interface circuit 330 may display a first image 372 of a first combination vehicle comprising a single towing vehicle and a single towed vehicle. The human interface circuit 330 may also display a second image 374 of a second combination vehicle comprising a single towing vehicle and a pair of two (2) towed vehicles. The human interface circuit 330 may still yet further display a third image 376 of a third combination vehicle comprising a single towing vehicle and a set of three (3) towed vehicles. The human operator may effect a selection by using a touch screen capability, for example, of the human interface circuit 330. In the example, the human interface circuit 330 includes a first selection zone 373 for selection by the operator of the first combination vehicle comprising the single towing vehicle and the single towed vehicle, a second selection zone 375 for selection by the operator of the second combination vehicle comprising the single towing vehicle and the pair of towed vehicles or a third 377 selection zone for selection by the operator of the third combination vehicle comprising the single towing vehicle and the set of three towed vehicles. As shown, the operator has selected the second combination vehicle 374 as being representative of the particular physical arrangement of the combination vehicle. It is to be appreciated that the processor 23 is responsive to the selection by the operator of one of the graphical presentations 372, 374, 376 to retrieve from the memory 240 actual first combination vehicle configuration data representative of first combination vehicle configuration information indirectly provided by the operator of the towing vehicle via the selection 375. As described, this relieves the operator of the burden of the need to input a large quantity of complicated data and instead affords the opportunity to select the combination vehicle configuration from a simple graphical representation thereby saving time and also minimizing the chance of improper entry of incorrect data.

Further in the embodiment illustrated, the braking controller automatic configuration input 320 comprises a communication circuit configured to transmit a request signal to the one or more towed vehicles of the combination vehicle, and to receive the automatic combination vehicle configuration signal from the one or more towed vehicles responsive to the request signal as one or more automatic combination vehicle configuration signals comprising the second combination vehicle configuration data representative of the second combination vehicle configuration information provided by the one or more towed vehicles of the combination vehicle. A suitable handshaking protocol is used in the example embodiment for communication between the towing vehicle and the one or more towed vehicles of the combination vehicle.

The braking controller 22 further includes a controller deceleration command input 360 such as may be delivered responsive to a braking command from an external source such as from the forward distance sensor 30 or from one or more commands of other platooning vehicles received via the V2V Unicast and/or V2V Broadcast communication described above. The controller deceleration command input 360 is operatively coupled with the processor 230 and receives a deceleration command signal 362 comprising deceleration command data 380 representative of a level of deceleration commanded to be achieved by the combination vehicle. The control logic of the example embodiment is operable to, responsive to receiving the deceleration command signal 362 selectively generate, based on the first result of the comparison between the first and second combination vehicle configuration data, a first brake control transmission signal 58 (FIG. 1) at a level to effect the deceleration command level in accordance with the non-enhanced braking mode of operation, and selectively generate, based on the second result of the comparison between the first and second combination vehicle configuration data, the brake control transmission signal 58 at a second level to effect the deceleration command level in accordance with the enhanced braking mode of operation.

For this end, the braking controller 22 includes a controller brake signal output 58 operatively coupled with the processor. The controller brake signal output 58 selectively transmits a one of the first brake control transmission signal or the second brake control transmission signal to the one or more towed vehicles of the combination vehicle.

Figure 3C:
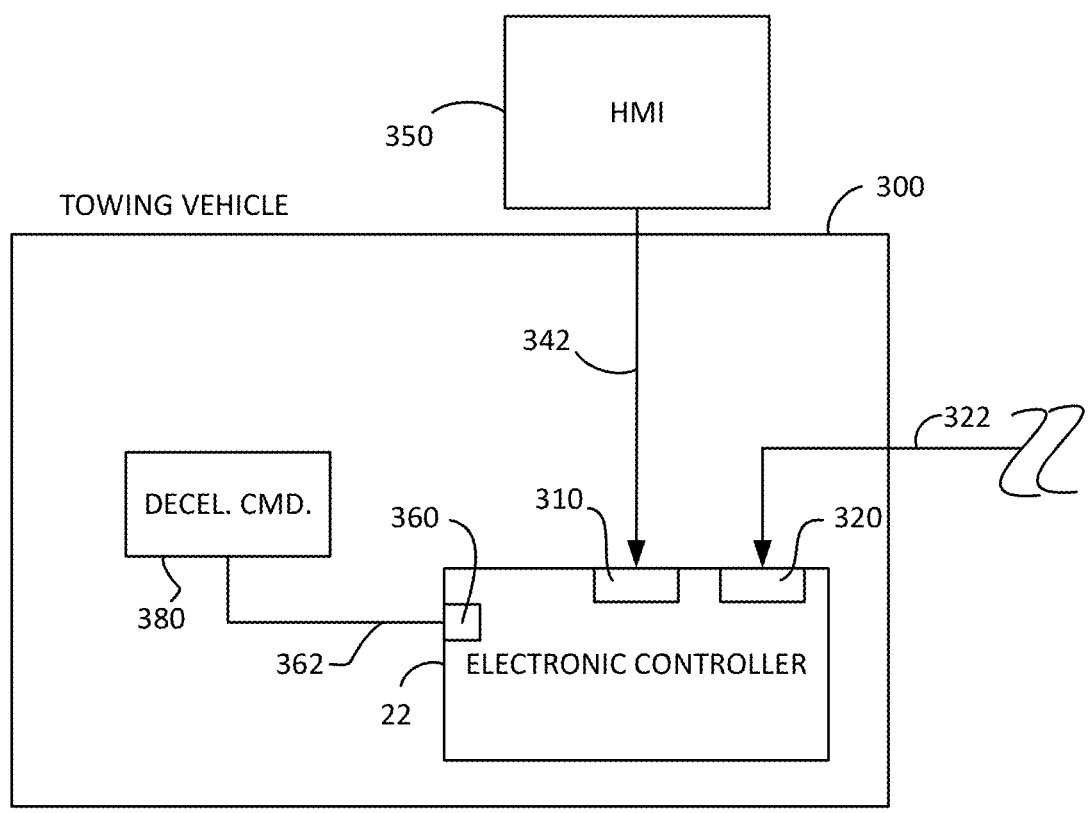
FIG. 3c is a functional block diagram illustrating the towing vehicle controller of FIG. 1 applied in a towing vehicle of a towing and towed vehicle combination in accordance with an embodiment using an automatic input of trailer data obtained from an associated source delivered or otherwise communicated to the towing vehicle

FIG. 3c is a functional block diagram illustrating the towing vehicle controller 22 of FIG. 1 applied in a towing vehicle 300 of a towing and towed vehicle combination in accordance with an embodiment using an automatic input of trailer data obtained from an associated source delivered or otherwise communicated to the towing vehicle. Similar to the embodiment described above in connection with FIG. 3a, the braking controller 22 in accordance with the further example embodiment as shown in FIG. 3c includes a processor 230 (FIG. 2), a controller second automatic configuration input 320 operatively coupled with the processor, a non-transient memory device 240 operatively coupled with the processor, and control logic 231 stored in the non-transient memory device and executable by the processor to perform braking control of the one or more vehicles of the combination vehicle. In the embodiment of FIG. 3c, however, the controller further also includes a controller first automatic configuration input 340 operatively coupled with the processor 230.

The controller first automatic configuration input 340 of this embodiment is adapted to receive a first automatic combination vehicle configuration signal 342 comprising first combination vehicle configuration data from an associated source 350 representative of first combination vehicle configuration information. The controller second automatic configuration input 320 operatively coupled with the processor is adapted to receive a second automatic combination vehicle configuration signal 322 comprising second combination vehicle configuration data representative of second combination vehicle configuration information provided by the one or more towed vehicles of the combination vehicle. Preferably, the first combination vehicle configuration data representative of the first combination vehicle configuration information is provided by the associated source 350 in operative communication with the associated towing vehicle 300 using a communication interface such as a wired communication interface, a wireless communication interface or any other form of communicating the data from the associated source to the controller. The first combination vehicle configuration data may include, for example, information related to: the number of towed vehicles attached to the towing vehicle, a list of trailer unit numbers such as serial numbers or other indicia of the trailers for example, an amount of loading of the trailers, a number of axles of the combination vehicle and/or of the towed vehicles, ABS information including serial number, configuration, etc. and/or any other data or other information as may be necessary or desired.

In the embodiment, the controller second automatic configuration input 320 is adapted to receive an automatic combination vehicle configuration signal 322 comprising second combination vehicle configuration data representative of second combination vehicle configuration information. Preferably, the second combination vehicle configuration data representative of the second combination vehicle configuration information is provided by the one or more towed vehicles of the combination vehicle using one or more suitable interfaces to be described in greater detail below.

The non-transient memory device 240 (FIG. 2) operatively coupled with the processor 230 stores the first and second combination vehicle configuration data received from the controller first 340 and second 320 automatic configuration inputs, and is executable by the processor to perform a comparison between the first combination vehicle configuration data and the second combination vehicle configuration data to determine a comparison result between the first combination vehicle configuration data and the second combination vehicle configuration data. In this example embodiment also, a braking mode of the one or more towed vehicles of the combination vehicle is determined as a one of an enhanced braking mode in accordance with a first result of the comparison or a non-enhanced braking mode in accordance with a second result of the comparison different than the first result of the comparison.

It is again to be appreciated that, as will be described below with reference to FIG. 4, the non-enhanced braking mode applies a first level of braking force to the one or more towed vehicles of the combination vehicle in a predetermined reduced proportion relative to a commanded level of braking force applied to the towing vehicle of the combination vehicle, and that the enhanced braking mode applies a second level of braking force to the one or more towed vehicles of the combination vehicle greater than the first level of braking force.

The braking controller 22 further includes a controller deceleration command input 360 such as may be delivered responsive to a braking command from an external source such as from the forward distance sensor 30 or from one or more commands of other platooning vehicles received via the V2V Unicast and/or V2V Broadcast communication described above. The controller deceleration command input 360 is operatively coupled with the processor 230 and receives a deceleration command signal 362 comprising deceleration command data 380 representative of a level of deceleration commanded to be achieved by the combination vehicle. The control logic of the example embodiment is operable to, responsive to receiving the deceleration command signal 362 selectively generate, based on the first result of the comparison between the first and second combination vehicle configuration data, a first brake control transmission signal 58 (FIG. 1) at a level to effect the deceleration command level in accordance with the non-enhanced braking mode of operation, and selectively generate, based on the second result of the comparison between the first and second combination vehicle configuration data, the brake control transmission signal 58 at a second level to effect the deceleration command level in accordance with the enhanced braking mode of operation.

For this end, the braking controller 22 includes a controller brake signal output 58 operatively coupled with the processor. The controller brake signal output 58 selectively transmits a one of the first brake control transmission signal or the second brake control transmission signal to the one or more towed vehicles of the combination vehicle.

Figure 4:
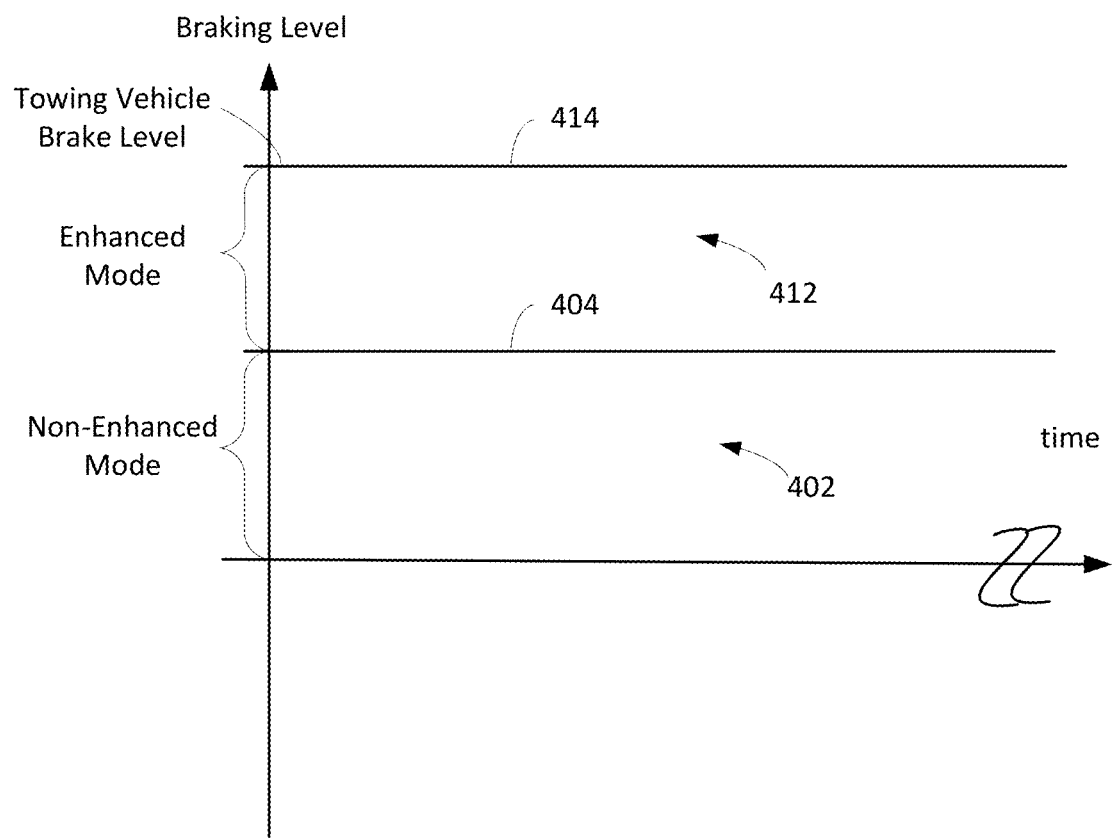
FIG. 4 is a graph representative of the various braking modes, thresholds, and relative braking values in accordance with the example embodiment.

FIG. 4 is a graph representative of the various braking modes, thresholds, and relative braking values in accordance with the example embodiment. As shown, the combination vehicle comprising an associated towing vehicle towing one or more towed vehicles as the combination vehicle may operate in a Non-Enhanced braking mode by applying a first level 402 of braking force to the one or more towed vehicles in a predetermined reduced proportion 404 relative to the level of braking force applied to the towing vehicle 414. The combination vehicle may also alternatively operate in an Enhanced braking mode by applying a second level 412 of braking force to the one or more towed vehicles greater than the first level 402, 404 of braking force.

It is to be appreciated that the predetermined reduced proportion 404 relative to the level of braking force applied to the towing vehicle 414 may be adjusted upwardly (more braking force) or downwardly (less braking force) as may be deemed necessary or desired. The adjustment of the predetermined reduced proportion 404 may be made manually by an operator of the towing vehicle, for example. The adjustment of the predetermined reduced proportion 404 may also be made automatically such as by a remote host fleet controller system (not shown) communicating the new or updated predetermined reduced proportion value to the towing vehicle via the transmitter/receiver (transceiver) module 250 described above, or by any other expedient means as may be desired.

With continued reference to FIG. 4, it is further to be appreciated that, preferably, the Non-Enhanced braking mode applies a first level of braking force to the one or more towed vehicles in the predetermined reduced proportion 404 relative to the level of braking force applied to the towing vehicle 414. However, the Non-Enhanced braking mode may be used to apply any level of braking force to the one or more towed vehicles that is less than the predetermined reduced proportion 404 relative to the level of braking force applied to the towing vehicle 414. Therefore, the Non-Enhanced braking mode is shown in the Figure as being a range of braking level that is less than the predetermined reduced proportion 404 relative to the level of braking force applied to the towing vehicle 414. Similarly, the Enhanced braking mode is shown in the Figure as being a range of braking level that is greater than the predetermined reduced proportion 404 relative to the level of braking force applied to the towing vehicle 414 and less than or equal to the level of braking force applied to the towing vehicle 414.

FIGS. 5*a*-9*b* are functional block diagrams illustrating the towing vehicle controller 22 of FIG. 1 applied in a towing vehicle 300 of a towing 300 and towed vehicle 301, 302, 303 combination vehicle 304. The towing vehicle controller 22 may receive information from one or more other platooning vehicle platoon members via one or more radio frequency (RF) antennas for wireless communication of platoon control and command data, GPS data, and the like when the APC system is activated by the operator. The one or more antennas are mounted on the tractor or towing vehicle. The information from the one or more radio frequency (RF) antennas is received by an input on the towing vehicle controller 22 or over the vehicle serial communication bus. The information received by the one or more radio frequency (RF) antennas 252 typically includes automated deceleration requests 380 (FIGS. 3*a*, 3*c*) received as commands from one or more other platooning vehicles transmitting via the V2V Unicast and/or V2V Broadcast communication described above. A deceleration signal is created in response to the automated deceleration request when the APC system determines that the automated deceleration request is valid and that the tractor needs to decelerate in order to maintain a certain following distance between the tractor and a target vehicle transmitting the automated deceleration request to the tractor. The brake control logic of the towing vehicle controller 22 processes the automated deceleration requests to generate a brake control transmission signal to be sent to the brake control unit 322 of the towed vehicle 320. The brake control unit(s) of the towed vehicle(s) 301, 302, 303 react to the signal to appropriately apply the trailer brakes in accordance with the brake control transmission signal.

In addition to the above and in accordance with the example embodiment, the brake control logic of the towing vehicle controller 22 is operable to receive capabilities and dynamic performance data related to the towing and towed vehicle combination. In further example embodiments herein, the towing vehicle controller 22 selectively applies the towed vehicle brakes commensurate with a reduced brake level as applied to the towing vehicle and in accordance with capabilities and dynamic performance data related to the towing and towed vehicle combination. The capabilities and dynamic performance data includes in the example, a signal indicative of activation by an operator of a brake pedal of the towing vehicle, and one or more physical and/or environmental parameters of the towed vehicle such as, for example, a stability condition of the tractor, such as, for example, a yaw rate signal and a lateral acceleration signal from a yaw rate sensor 26 and lateral acceleration sensor.

Figure 5A:
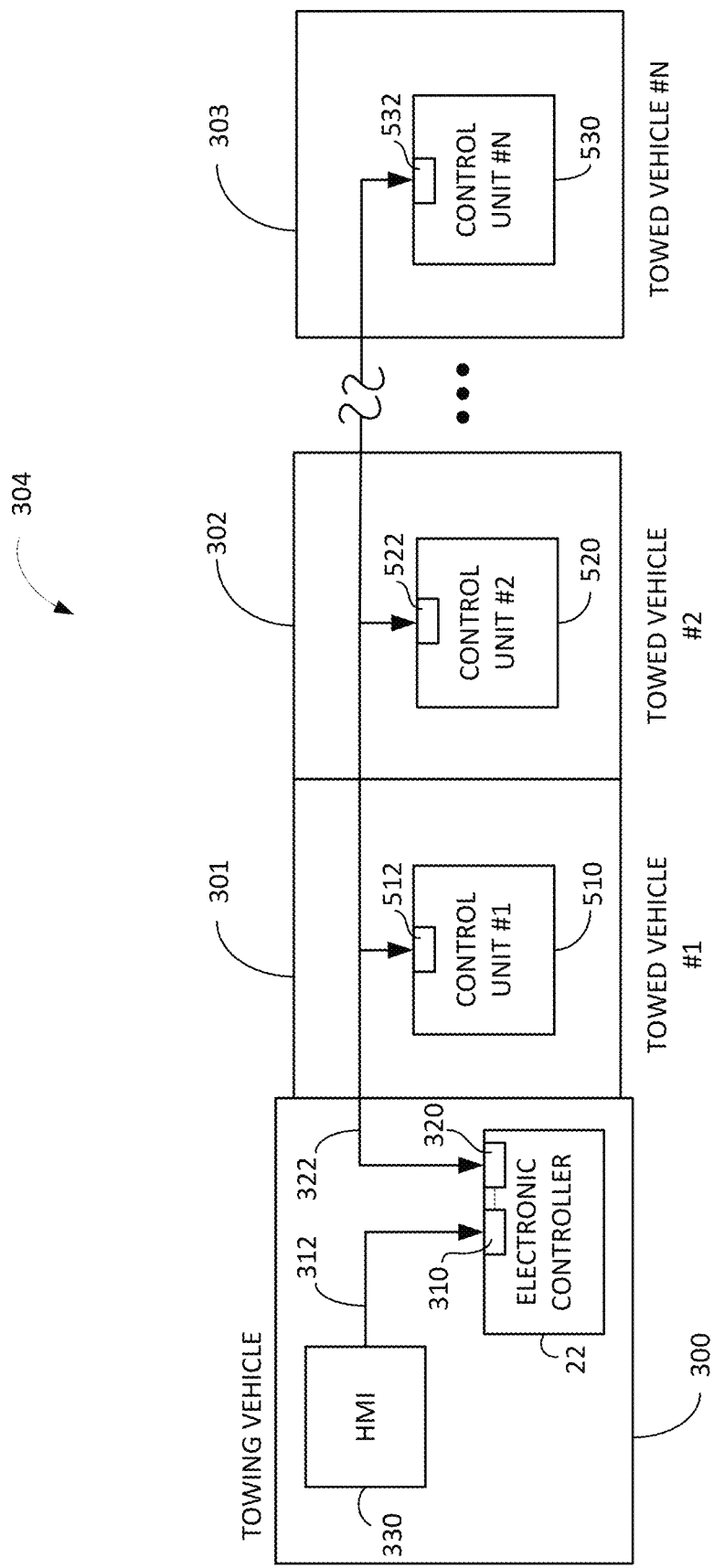
FIGS. 5a and 5b are diagrammatic showings of a wired communication connection between the towing vehicle and several towed vehicles, and further showing local and remote towed vehicle configuration communication.

FIG. 5*a* is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to the electronic controller 22 by a manual configuration input 310, and the second combination vehicle data is obtained or otherwise sent to the electronic controller 22 by an automatic configuration input 320. Similarly, FIG. 5*b* is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to a first automatic configuration input 340 of the electronic controller 22 from an associated source 350, and the second combination vehicle data is obtained or otherwise sent to the electronic controller 22 by the automatic configuration input 320.

In these example embodiments, the controller automatic configuration input braking controller includes a wired communication circuit configured to receive the automatic combination vehicle configuration signal as one or more wired signals corresponding to the one or more towed vehicles. The wired communication circuit may include, as may be necessary and/or desired, one or more of a wired power line communication (PLC) communication circuit, an Ethernet network communication circuit, and/or a wired controller area network (CAN) communication circuit.

Figure 5B:
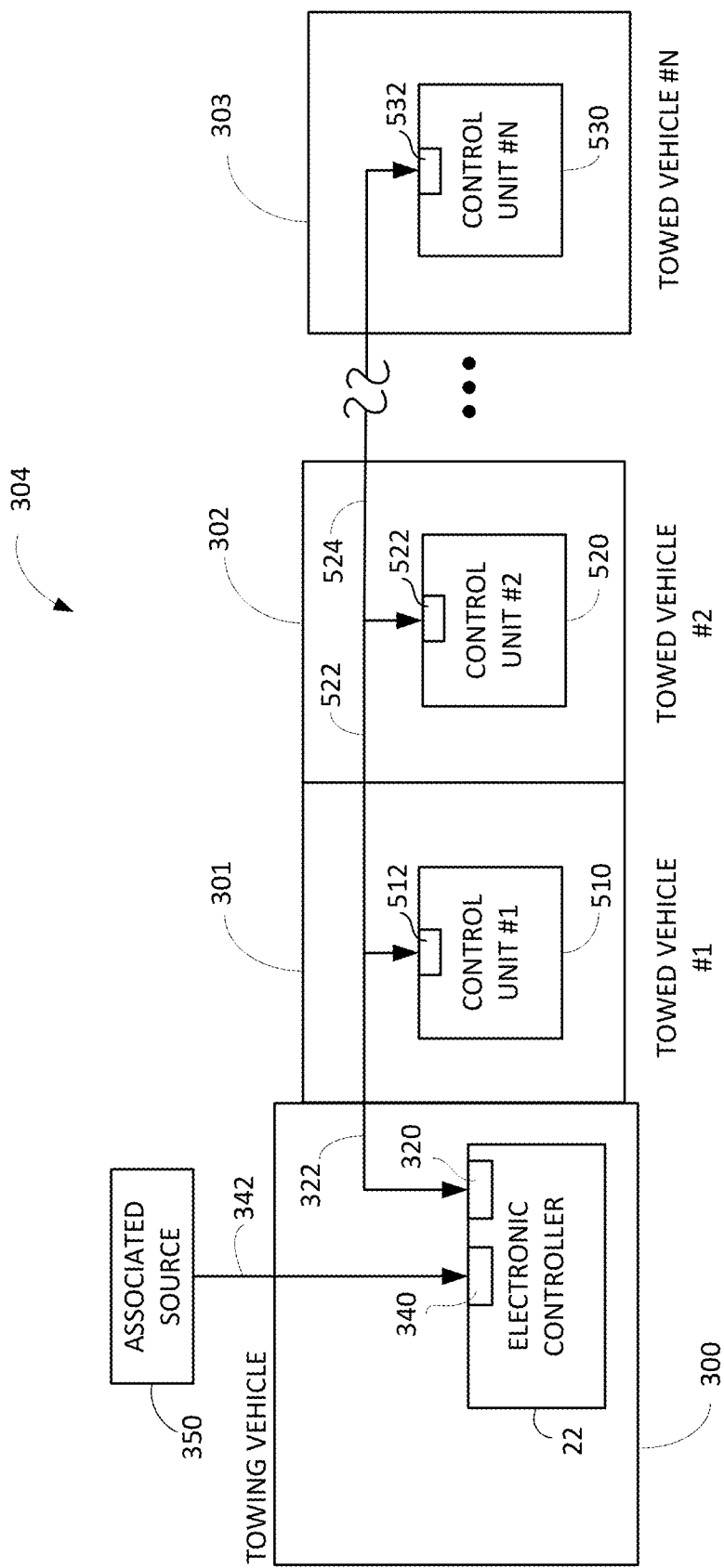

As shown in FIGS. 5*a* and 5*b*, the first towed vehicle 301 includes a control unit 510 having a communication interface 512 in operative communication with the automatic combination vehicle configuration signal 322 of the controller 22, and a second communication interface 514 in operative communication with a control unit 520 of the second towed vehicle 302 via a first communication interface 522 of the second towed vehicle 302. Similarly, the second towed vehicle 302 includes a control unit 520 having a communication interface 522 in operative communication with the second communication interface 514 of the first towed vehicle 301, and a second communication interface 524 in operative communication with a control unit 530 of the third towed vehicle 303 via a first communication interface 532 of the third towed vehicle 302. Using this wired connection strategy, the automatic combination vehicle configuration signals and other command and data signals are easily and efficiently communicated between the towed and towing vehicles. The wired communication circuit may include, as may be necessary and/or desired extending from between the towing vehicle 300 and the last in the series of towed vehicles 303, one or more of a wired power line communication (PLC) communication circuit, an Ethernet network communication circuit, and/or a wired controller area network (CAN) communication circuit.

Figure 6A:
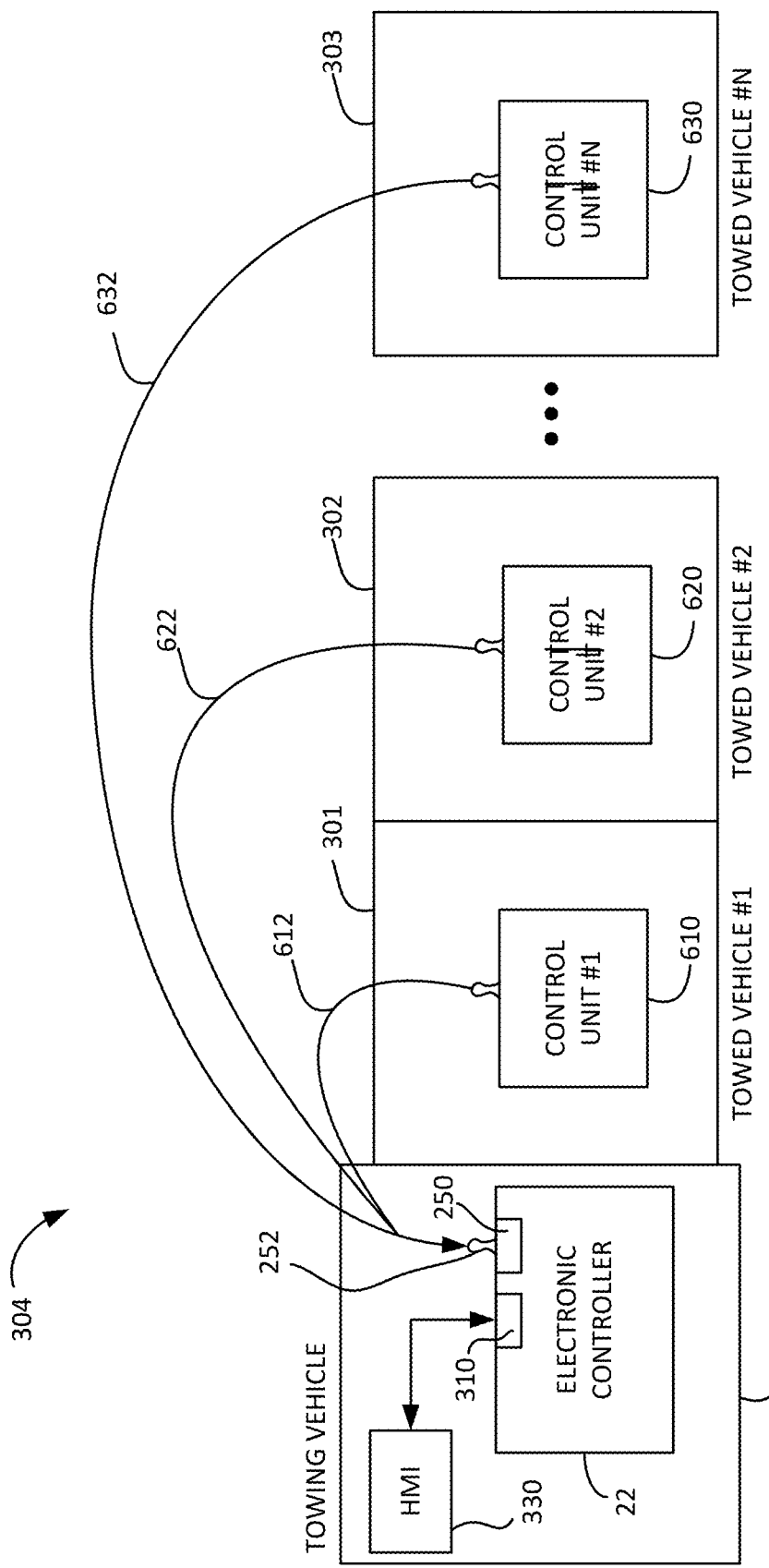
FIGS. 6a and 6b are diagrammatic showings of a wireless communication connection between the towing vehicle and several towed vehicles, and further showing local and remote towed vehicle configuration communication.

FIG. 6*a* is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to the electronic controller 22 by a manual configuration input 310, and the second combination vehicle data is obtained or otherwise sent wirelessly by control units of the towed vehicles to the electronic controller 22 by an automatic configuration input 320. Similarly, FIG. 6*b* is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to a first automatic configuration input 340 of the electronic controller 22 from an associated source 350, and the second combination vehicle data is obtained or otherwise sent wirelessly by control units of the towed vehicles to the electronic controller 22 by the automatic configuration input 320.

In these example embodiments, the controller automatic configuration input braking controller includes a wireless communication circuit configured to receive the automatic combination vehicle configuration signals from the control units of the towed vehicles as one or more wireless signals corresponding to the one or more towed vehicles. The wireless communication circuit may include, as may be necessary and/or desired, one or more of a wireless networking WiFi communication circuit, a wireless Bluetooth communication circuit, a wireless dedicated short range communications (DSRC) communication circuit, an LDP433 communication circuit, a radio frequency (RF) communication circuit, a wireless cellular communication circuit, and/or a wireless satellite communication circuit.

Figure 6B:
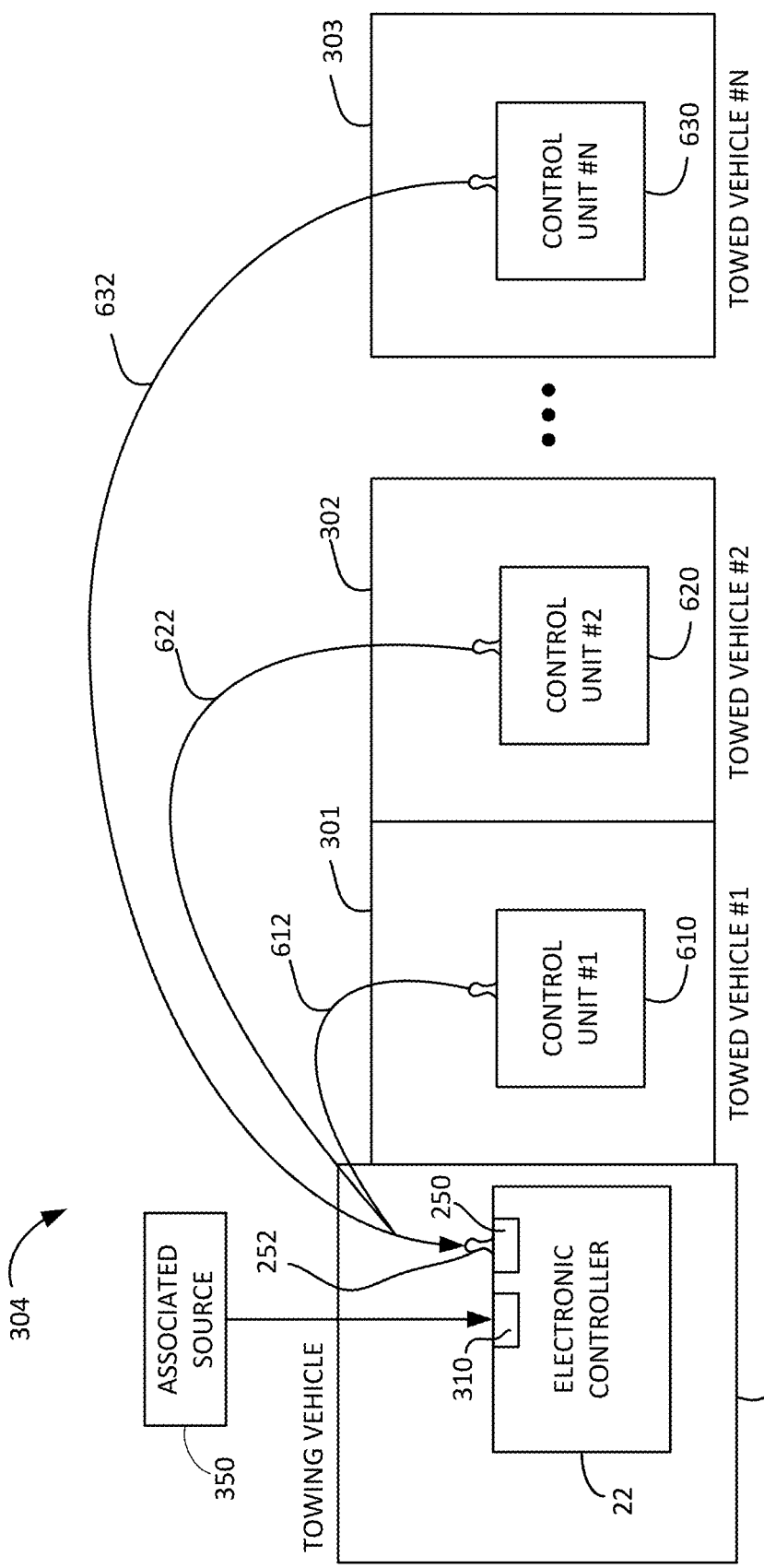

As shown in FIGS. 6a and 6b, the first towed vehicle 301 includes a control unit 610 having a transmitter/receiver (transceiver) module such as, for example, a radio frequency (RF) transmitter including one or more antennas 252 in operative communication with the transmitter/receiver (transceiver) module 250 (FIG. 1) of the controller 22. In that way, a wireless signal 612 can be sent from the control unit 610 of the first towed vehicle 301 to the controller 22 of the towing vehicle 300. Similarly, the second towed vehicle 302 includes a control unit 620 having a transmitter/receiver (transceiver) module such as, for example, a radio frequency (RF) transmitter including one or more antennas 252 in operative communication with the transmitter/receiver (transceiver) module 250 (FIG. 1) of the controller 22. In that way, a wireless signal 622 can be sent from the control unit 620 of the second towed vehicle 302 to the controller 22 of the towing vehicle 300. Lastly in the example embodiment, the third towed vehicle 303 includes a control unit 630 having a transmitter/receiver (transceiver) module such as, for example, a radio frequency (RF) transmitter including one or more antennas 252 in operative communication with the transmitter/receiver (transceiver) module 250 (FIG. 1) of the controller 22. In that way, a wireless signal 632 can be sent from the control unit 630 of the third towed vehicle 303 to the controller 22 of the towing vehicle 300. Using this direct wireless communication connection strategy, the automatic combination vehicle configuration signals and other command and data signals are easily and efficiently communicated between the towed and towing vehicles. The wireless communication circuit may include, as may be necessary and/or desired one or more of a wireless networking WiFi communication circuit, a wireless Bluetooth communication circuit, a wireless dedicated short range communications (DSRC) communication circuit, an LDP433 communication circuit, and/or a radio frequency (RF) communication circuit. It is to be appreciated that other wireless network topologies may also be used such as for example a mesh network in which case the one or more towed vehicles may communicate and thereby relay information.

Figure 7A:
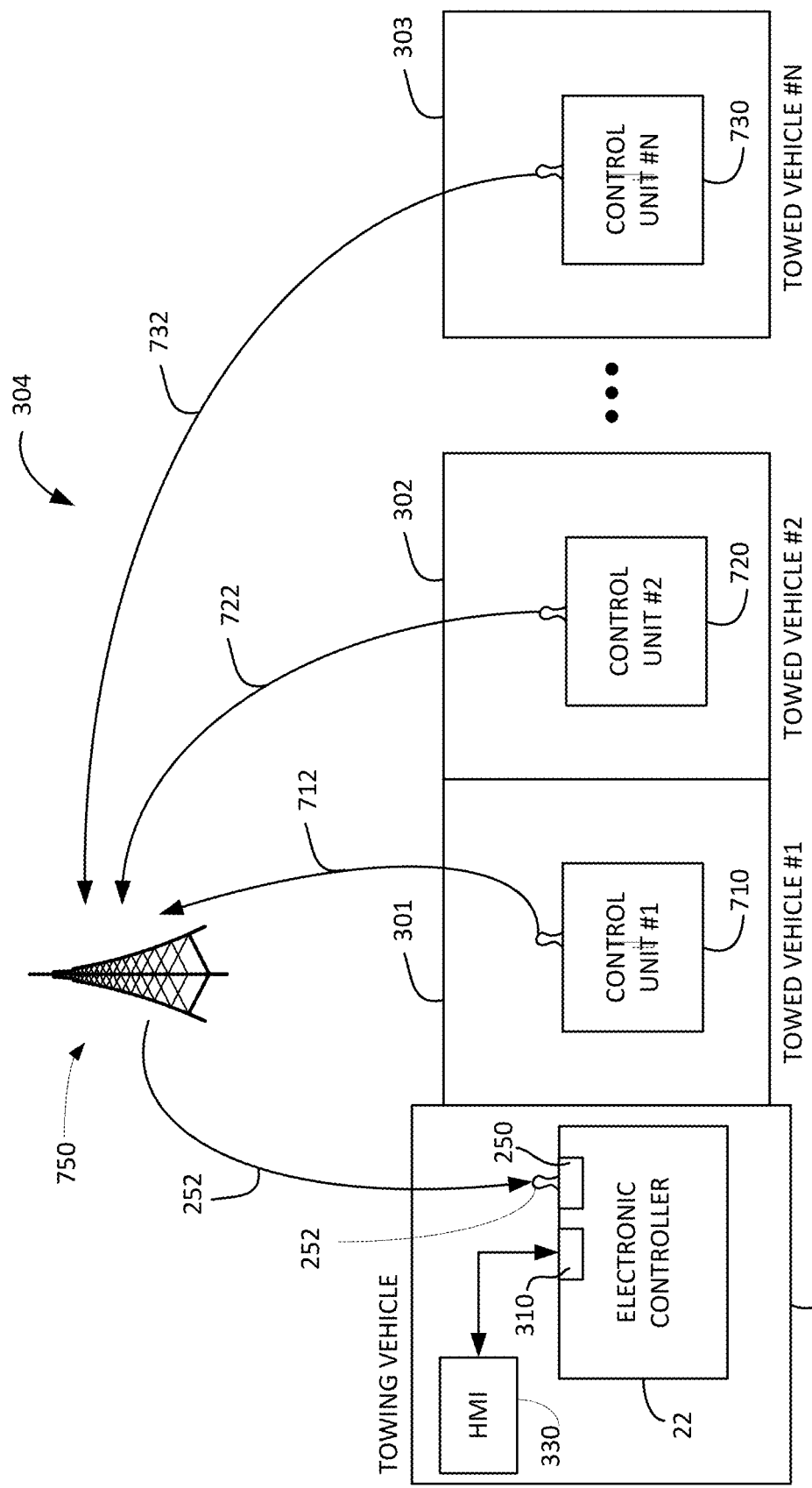
FIGS. 7a and 7b are diagrammatic showings of a wireless cellular communication connection between the towing vehicle and several towed vehicles, and further showing local and remote towed vehicle configuration communication.

FIG. 7a is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to the electronic controller 22 by a manual configuration input 310, and the second combination vehicle data is obtained or otherwise sent wirelessly by control units of the towed vehicles to the electronic controller 22 by an automatic configuration input 320. Similarly, FIG. 7b is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to a first automatic configuration input 340 of the electronic controller 22 from an associated source 350, and the second combination vehicle data is obtained or otherwise sent wirelessly by control units of the towed vehicles to the electronic controller 22 by the automatic configuration input 320.

In these example embodiments, the controller automatic configuration input braking controller includes a wireless communication circuit configured to receive the automatic combination vehicle configuration signals from the control units of the towed vehicles as one or more wireless signals corresponding to the one or more towed vehicles. The wireless communication circuit may include, as may be necessary and/or desired, one or more of a wireless networking WiFi communication circuit using an intermediate unit or transceiver station 750, a wireless Bluetooth communication circuit using an intermediate transceiver station 750, a wireless dedicated short range communications (DSRC) communication circuit using an intermediate transceiver unit or station 750, an LDP433 communication circuit, a radio frequency (RF) communication circuit using an intermediate transceiver station 750, or a wireless cellular communication circuit using an intermediate transceiver unit or station 750.

Figure 7B:
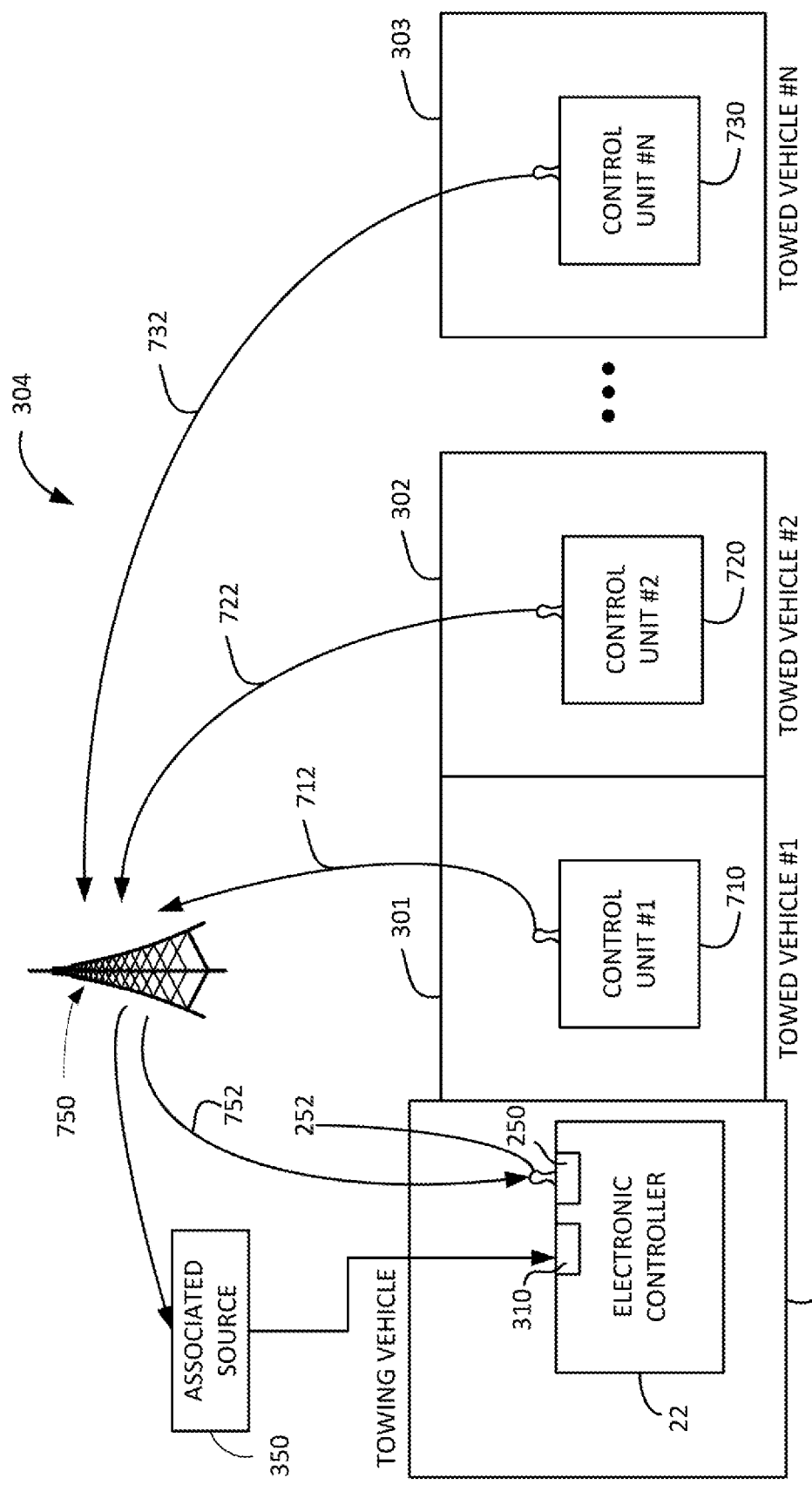

As shown in FIGS. 7a and 7b, the first towed vehicle 301 includes a control unit 710 having a transmitter/receiver (transceiver) module such as, for example, a wireless cellular communication transmitter including one or more antennas 252 in operative communication with the transmitter/receiver (transceiver) module 250 (FIG. 1) of the controller 22 via an intermediate wireless transceiver unit or station 750. In that way, a wireless signal 712 can be sent from the control unit 710 of the first towed vehicle 301 to the intermediate wireless transceiver unit or station 750, and then in turn to the controller 22 of the towing vehicle 300. Similarly, the second towed vehicle 302 includes a control unit 720 having a transmitter/receiver (transceiver) module such as, for example, a wireless cellular communication transmitter including one or more antennas 252 in operative communication with the transmitter/receiver (transceiver) module 250 (FIG. 1) of the controller 22 via an intermediate wireless transceiver unit or station 750. In that way, a wireless signal 722 can be sent from the control unit 720 of the second towed vehicle 302 to the intermediate wireless transceiver unit or station 750, and then in turn to the controller 22 of the towing vehicle 300. Lastly in the example embodiment, the third towed vehicle 303 includes a control unit 730 having a transmitter/receiver (transceiver) module such as, for example, a wireless cellular communication transmitter including one or more antennas 252 in operative communication with the transmitter/receiver (transceiver) module 250 (FIG. 1) of the controller 22 via an intermediate wireless transceiver unit or station 750. In that way, a wireless signal 732 can be sent from the control unit 730 of the second towed vehicle 303 to the intermediate wireless transceiver unit or station 750, and then in turn to the controller 22 of the towing vehicle 300. Using this indirect wireless communication connection strategy, the automatic combination vehicle configuration signals and other command and data signals are easily and efficiently communicated between the towed and towing vehicles. The wireless communication circuit may include, as may be necessary and/or desired one or more of one or more of a wireless networking WiFi communication circuit using an intermediate unit or transceiver station 750, a wireless Bluetooth communication circuit using an intermediate transceiver station 750, a wireless dedicated short range communications (DSRC) communication circuit using an intermediate transceiver unit or station 750, an LDP433 communication circuit, a radio frequency (RF) communication circuit using an intermediate transceiver station 750, or a wireless cellular communication circuit using an intermediate transceiver unit or station 750. It is to be appreciated that the associated source may be provided wirelessly as shown in the drawing Figure.

Figure 8A:
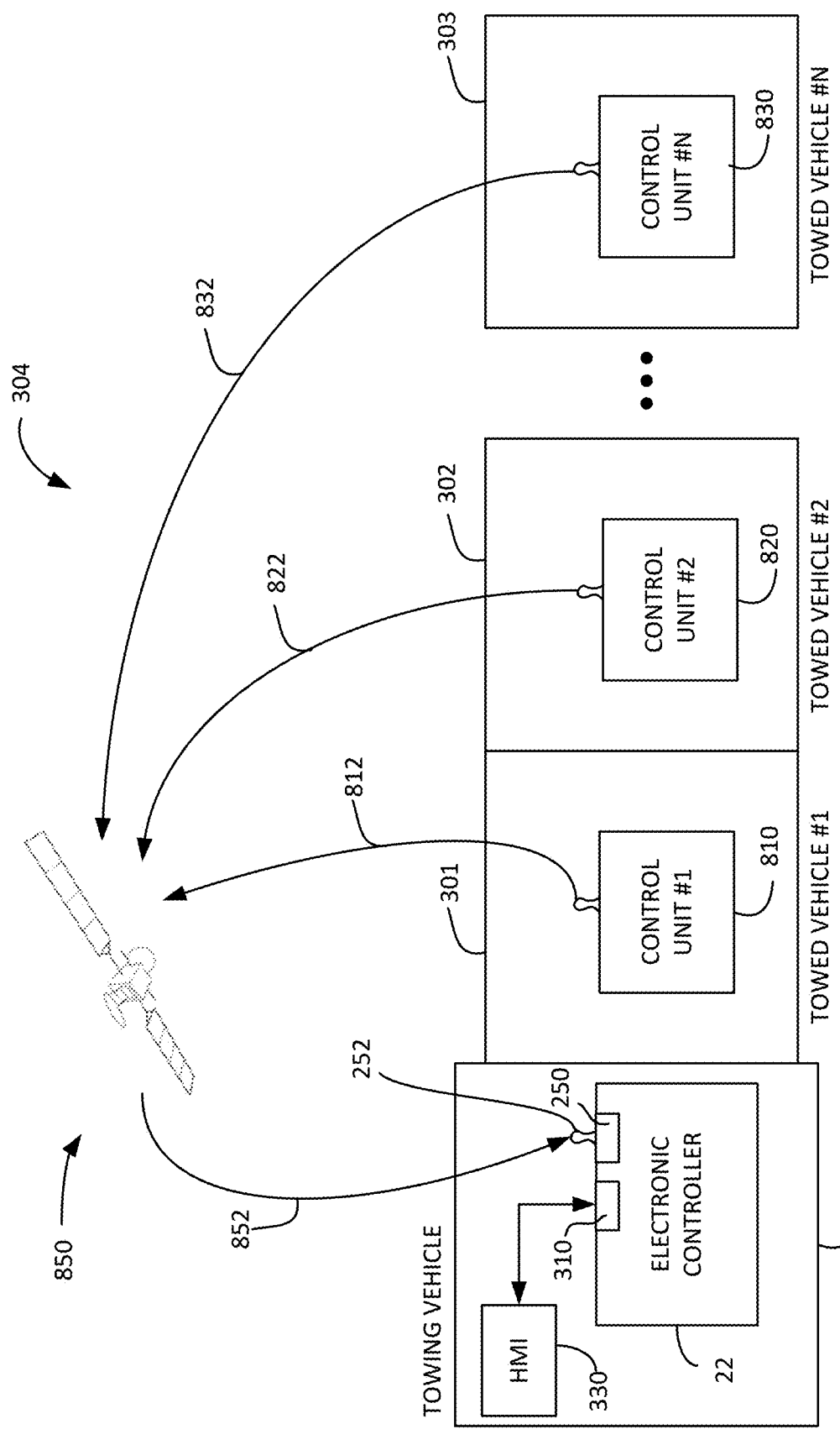
FIGS. 8a and 8b are diagrammatic showings of a wireless satellite communication connection between the towing vehicle and several towed vehicles, and further showing local and remote towed vehicle configuration communication.

FIG. 8a is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to the electronic controller 22 by a manual configuration input 310, and the second combination vehicle data is obtained or otherwise sent wirelessly by control units of the towed vehicles to the electronic controller 22 by an automatic configuration input 320. Similarly, FIG. 8b is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to a first automatic configuration input 340 of the electronic controller 22 from an associated source 350, and the second combination vehicle data is obtained or otherwise sent wirelessly by control units of the towed vehicles to the electronic controller 22 by the automatic configuration input 320.

In these example embodiments, the controller automatic configuration input braking controller includes a wireless communication circuit configured to receive the automatic combination vehicle configuration signals from the control units of the towed vehicles as one or more wireless signals corresponding to the one or more towed vehicles. The wireless communication circuit may include, as may be necessary and/or desired, a wireless satellite communication circuit sending and receiving wireless satellite communication signals to an associated satellite 850.

Figure 8B:
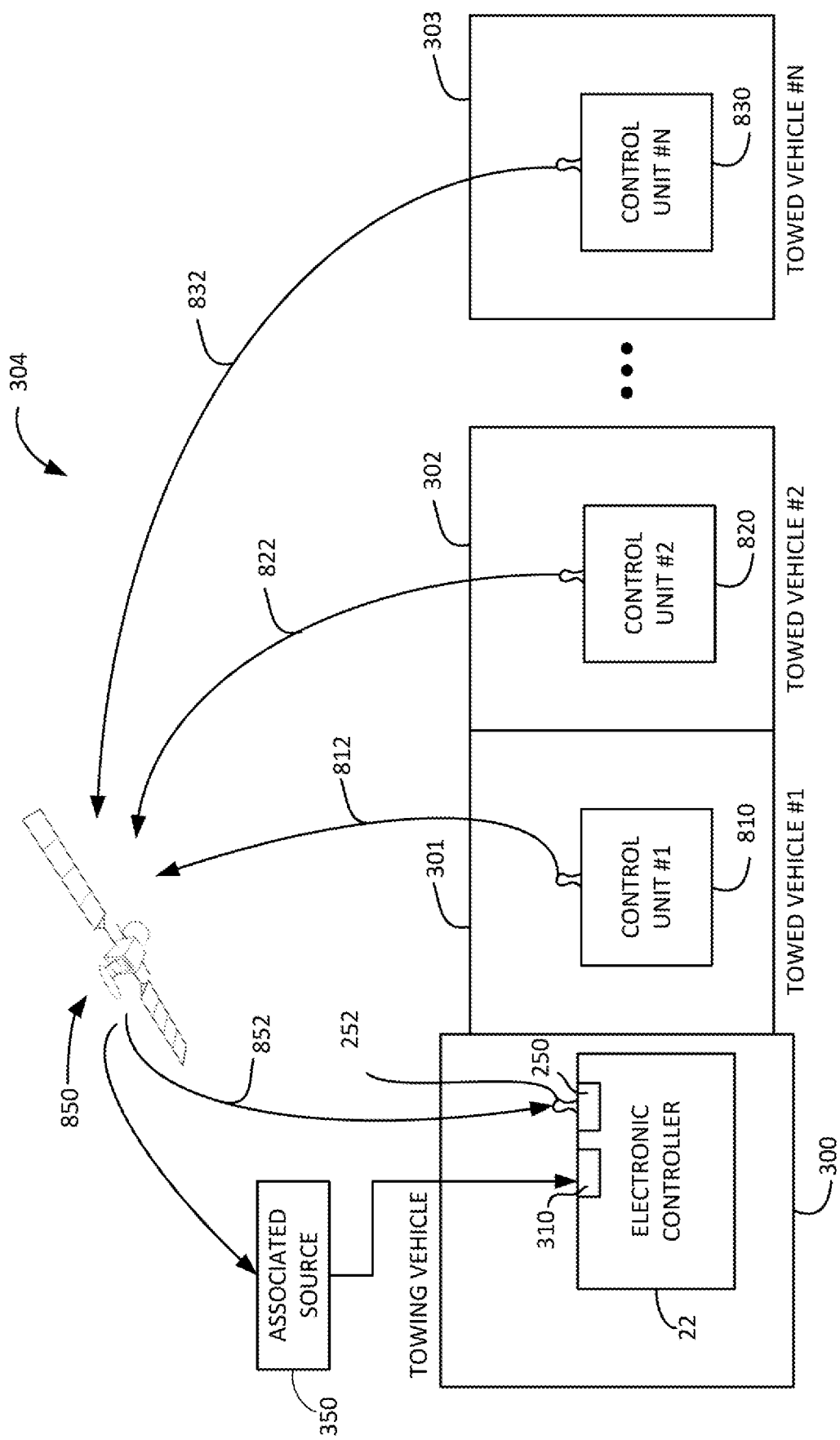

As shown in FIGS. 8a and 8b, the first towed vehicle 301 includes a control unit 810 having a transmitter/receiver (transceiver) module such as, for example, a wireless satellite communication transmitter including one or more antennas 252 in operative communication with the transmitter/receiver (transceiver) module 250 (FIG. 1) of the controller 22 via an intermediate wireless satellite unit or station 850. In that way, a wireless signal 812 can be sent from the control unit 810 of the first towed vehicle 301 to the intermediate wireless satellite unit or station 850, and then in turn to the controller 22 of the towing vehicle 300. Similarly, the second towed vehicle 302 includes a control unit 820 having a transmitter/receiver (transceiver) module such as, for example, a wireless satellite communication transmitter including one or more antennas 252 in operative communication with the transmitter/receiver (transceiver) module 250 (FIG. 1) of the controller 22 via an intermediate wireless satellite transceiver unit or station 850. In that way, a wireless signal 822 can be sent from the control unit 820 of the second towed vehicle 302 to the intermediate wireless transceiver satellite unit or station 850, and then in turn to the controller 22 of the towing vehicle 300. Lastly in the example embodiment, the third towed vehicle 303 includes a control unit 830 having a transmitter/receiver (transceiver) module such as, for example, a wireless satellite communication transmitter including one or more antennas 252 in operative communication with the transmitter/receiver (transceiver) module 250 (FIG. 1) of the controller 22 via an intermediate wireless satellite transceiver unit or station 850. In that way, a wireless signal 832 can be sent from the control unit 830 of the second towed vehicle 303 to the intermediate wireless satellite transceiver unit or station 850, and then in turn to the controller 22 of the towing vehicle 300. Using this indirect wireless communication connection strategy using one or more satellites 850, the automatic combination vehicle configuration signals and other command and data signals are easily and efficiently communicated between the towed and towing vehicles. The wireless communication circuit may include, as may be necessary and/or desired one or more of a wireless satellite communication circuit using an intermediate satellite transceiver unit or station 850. It is to be appreciated that the associated source may be provided wirelessly such as shown in the drawing Figure by satellite communication, for example.

Figure 9A:
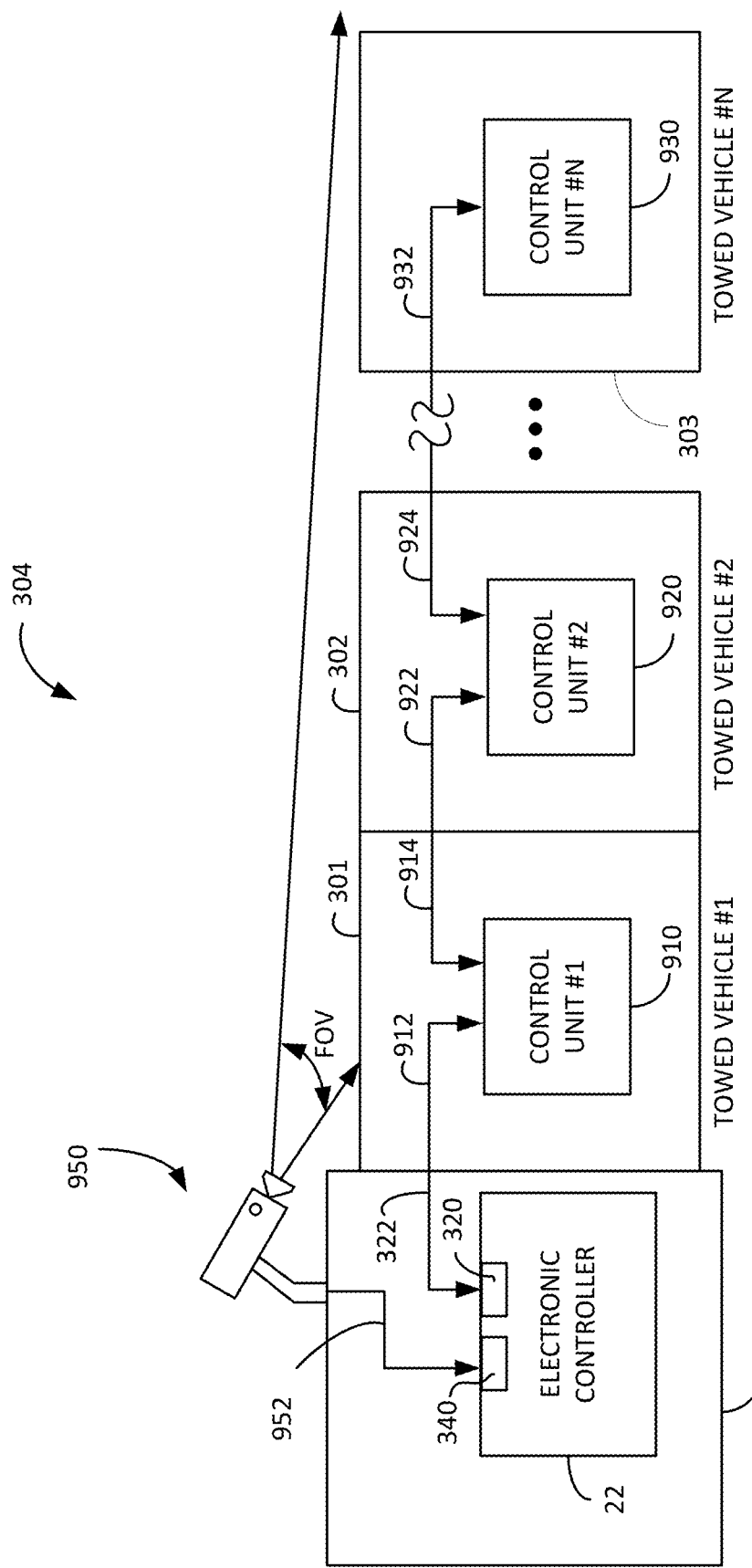
FIGS. 9a and 9b are diagrammatic showings of a wired communication connection between the towing vehicle and several towed vehicles, and further showing local and remote towed vehicle image data acquisition.

FIG. 9a is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to the electronic controller 22 by an automatic configuration input 340 from an associated local camera source 950, and the second combination vehicle data is obtained or otherwise sent to the electronic controller 22 by an automatic configuration input 320. Similarly, FIG. 9b is a functional block diagram illustrating the towing vehicle controller 22 of FIG. 1 applied in a towing vehicle 300 of a towing 300 and towed vehicle 301, 302, 303 combination vehicle 304 in accordance with an embodiment wherein the first combination vehicle data is obtained or otherwise sent to a first automatic configuration input 340 of the electronic controller 22 from an associated remote camera source 960, and the second combination vehicle data is obtained or otherwise sent to the electronic controller 22 by the automatic configuration input 320.

In these example embodiments, the controller automatic configuration input braking controller includes a wired communication circuit configured to receive the automatic combination vehicle configuration signal as one or more wired signals corresponding to the one or more towed vehicles. The wired communication circuit may include, as may be necessary and/or desired, one or more of a wired power line communication (PLC) communication circuit, an Ethernet network communication circuit, and/or a wired controller area network (CAN) communication circuit.

Figure 9B:
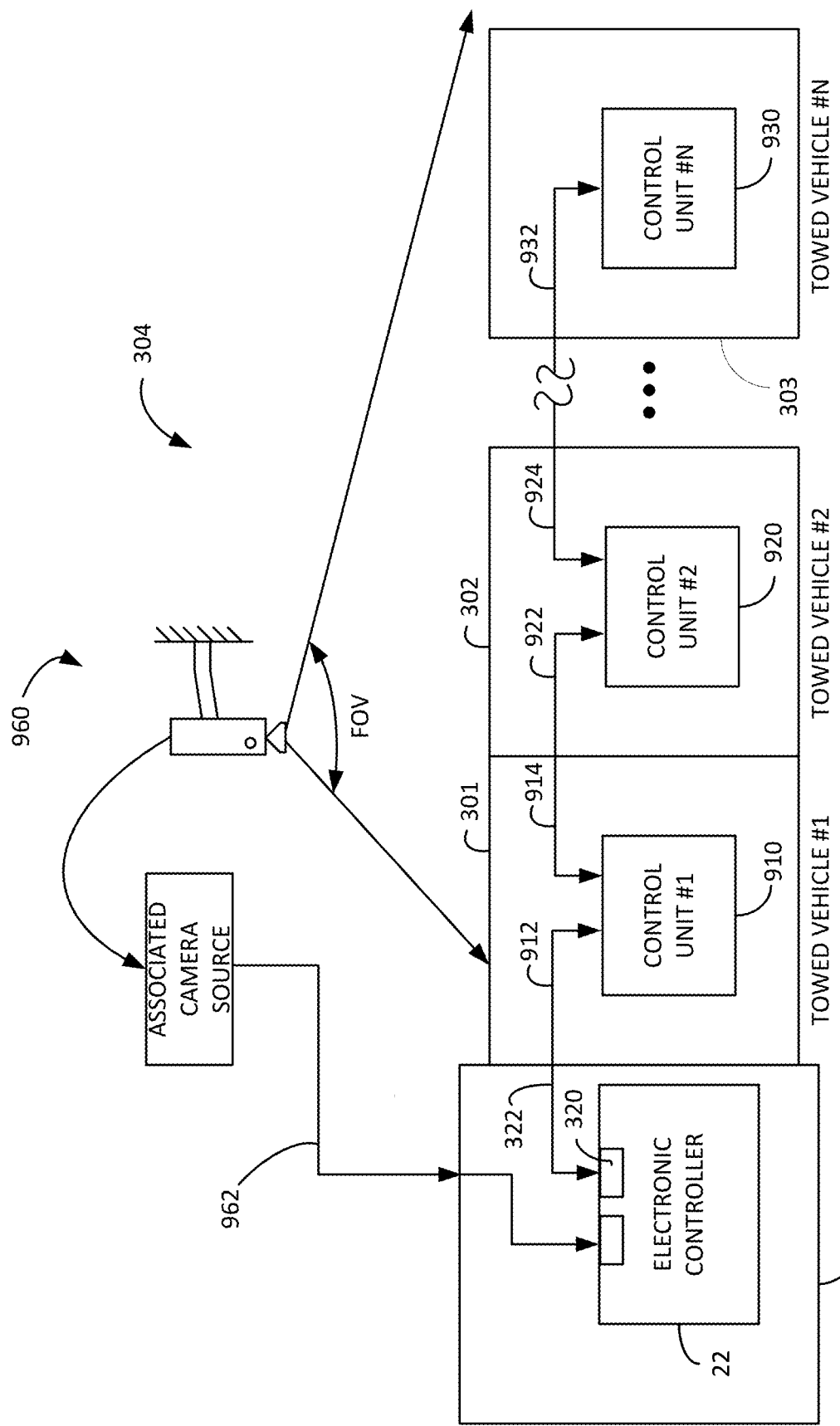

As shown in FIGS. 9a and 9b, the first towed vehicle 301 includes a control unit 910 having a communication interface 912 in operative communication with the automatic combination vehicle configuration signal 322 of the controller 22, and a second communication interface 914 in operative communication with a control unit 920 of the second towed vehicle 302 via a first communication interface 922 of the second towed vehicle 302. Similarly, the second towed vehicle 302 includes a control unit 920 having a communication interface 922 in operative communication with the second communication interface 914 of the first towed vehicle 301, and a second communication interface 924 in operative communication with a control unit 930 of the third towed vehicle 303 via a first communication interface 932 of the third towed vehicle 302. Using this daisy chain wired connection strategy, the automatic combination vehicle configuration signals and other command and data signals are easily and efficiently communicated between the towed and towing vehicles. The wired communication circuit may include, as may be necessary and/or desired extending from between the towing vehicle 300 and the last in the series of towed vehicles 303, one or more of a wired power line communication (PLC) communication circuit, an Ethernet network communication circuit, and/or a wired controller area network (CAN) communication circuit.

Further in the embodiment illustrated, the controller first automatic configuration input comprises a communication circuit in operative selective communication with one or more associated camera devices positioned relative to the one or more towed vehicles to obtain at least one image of the one or more towed vehicles and deliver the at least one image to the wireless communication circuit as the first combination vehicle configuration data. In the embodiment shown in FIG. 9a, the associated local camera 950 is mounted on the towing vehicle in a manner to have the towed vehicles 301, 302, 303 with the field of view (FOV) of the camera 950, thereby providing the controller with data representative of the number of towed vehicles being towed by the towing vehicle. It is to be appreciated that the one or more towed vehicles need not always be within the FOV of the camera, but rather only need to be within the FOV for a period of time sufficient to allow inspection of the towed units by the camera such as might be available to the camera when the combination vehicle is turning, or the like. Similarly, as shown in the embodiment of FIG. 9b, the associated remote camera 960 is mounted on an associated structure removed from the combination vehicle such as, for example, mounted to a wall at a truck depot. The associated remote camera 960 is mounted on the associated structure in such a manner as to have the towed vehicles 301, 302, 303 with the field of view (FOV) of the camera 960, thereby providing the controller with data representative of the number of towed vehicles being towed by the towing vehicle.

It is to be appreciated that, although local and remote camera devices are illustrated in the Figures, the trailer data acquisition devices may be one or more radar devices operatively coupled with the controller first automatic configuration input. In this alternative embodiment, the one or more radar devices are positioned relative to the one or more towed vehicles and are thereby operable to obtain at least one distance measure of the one or more towed vehicles relative to the towing vehicle for delivering the at least one distance measure to the controller first automatic configuration input as the first combination vehicle configuration data.

It is further to be appreciated that, although local and remote camera devices are illustrated in the Figures, the trailer data acquisition devices may also be one or more Light Detection and Ranging (LIDAR) sensor devices operatively coupled with the controller first automatic configuration input. In this alternative embodiment, the one or more LIDAR devices are positioned relative to the one or more towed vehicles and are thereby operable to obtain at least one range measure of the one or more towed vehicles relative to the towing vehicle for delivering the at least one range measure to the controller first automatic configuration input as the first combination vehicle configuration data.

Figure 10:
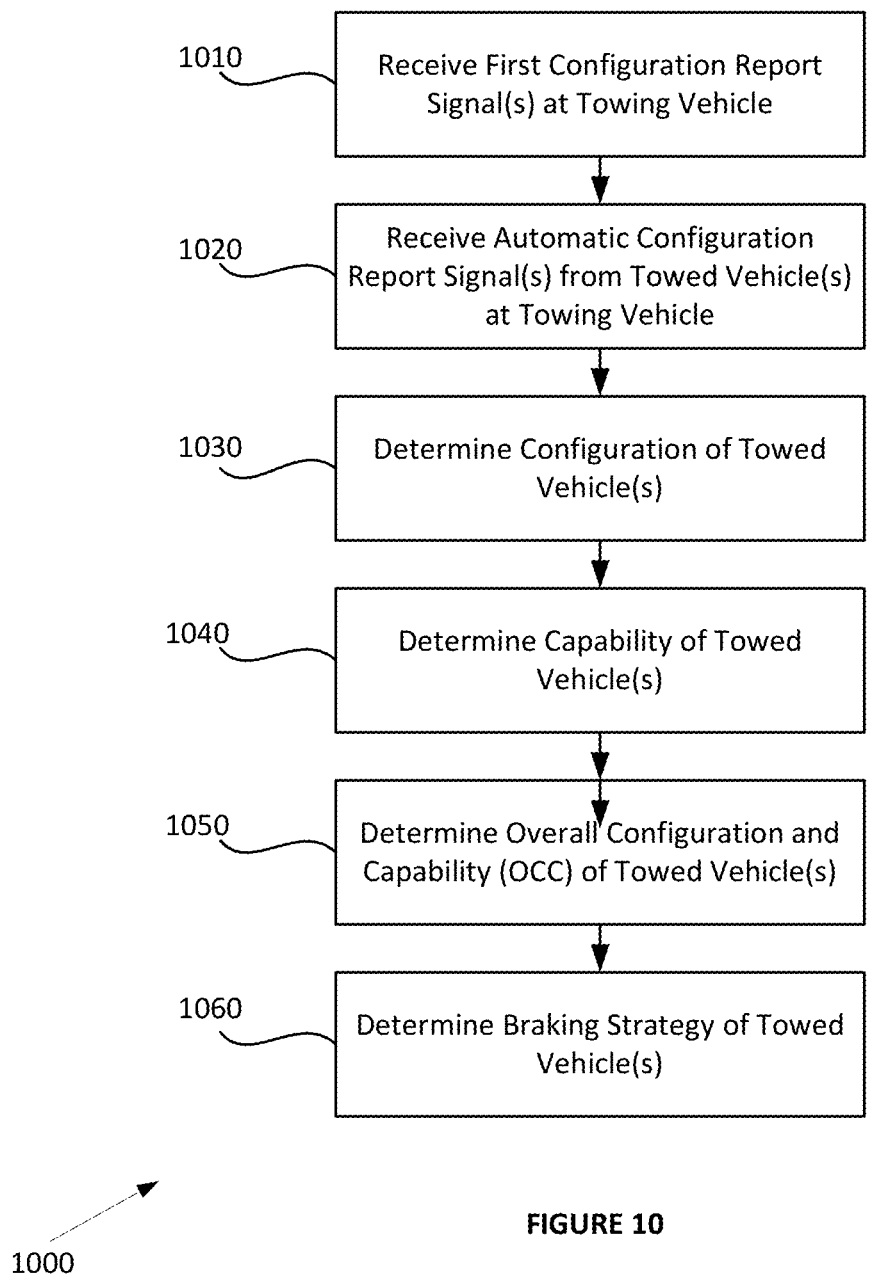
FIG. 10 is a flow diagram showing a brake control method 1000 using verification of reported trailer capabilities data in accordance with an example embodiment.

FIG. 10 is a flow diagram showing a brake control method 1000 using verification of reported trailer capabilities data in accordance with an example embodiment. As noted above, the towing vehicle controller 22 is provided for communication and control functions. Logic such as software or other forms of executable instructions or the like are executed by the processor of the towing vehicle controller 22 in order to conduct communication functionality, vehicle and driver parameter manipulation, and braking strategy management including, in the example embodiment, brake strategy management for vehicle operation. Although the portions of the methods and sub-methods to be described herein are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In one example, executable instructions associated with performing a method may be embodied as a logic 231 (FIG. 2) encoded in one or more tangible media for execution. When executed, the instructions may perform a method. Thus, in one example, logic encoded in one or more tangible media may store computer executable instructions that when executed by a machine (e.g., processor) cause the machine to perform the methods and sub-methods described herein. While executable instructions associated with the above method are described as being embodied as logic encoded in one or more tangible media, it is to be appreciated that executable instructions associated with other example methods described herein may also be stored on a tangible media, and that the instructions may be performed by discrete hardware devices or by combinations of discrete hardware devices working together with logic encoded in the one or more tangible media and executable by the processor.

In general and broadly in accordance with an example embodiment, a brake control method for use with an associated towing vehicle towing one or more towed vehicles as a combination vehicle is provided using verification of reported trailer capabilities data. The method includes receiving at a controller manual configuration input operatively coupled with a processor, a manual combination vehicle configuration signal comprising first combination vehicle configuration data representative of first combination vehicle configuration information provided by an associated operator of the associated towing vehicle. The method further includes receiving at a controller automatic configuration input operatively coupled with the processor, an automatic combination vehicle configuration signal comprising second combination vehicle configuration data representative of second combination vehicle configuration information provided by the one or more towed vehicles of the combination vehicle. The first and second combination vehicle configuration data are stored in a memory operatively coupled with the processor; and a comparison is performed by control logic operatively coupled with the memory and executable by the processor. The comparison is made between the first combination vehicle configuration data and the second combination vehicle configuration data to determine a comparison result between the first combination vehicle configuration data and the second combination vehicle configuration data. The control logic determines a braking mode of the one or more towed vehicles of the combination vehicle as a one of an enhanced braking mode in accordance with a first result of the comparison or a non-enhanced braking mode in accordance with a second result of the comparison different than the first result of the comparison. In the example embodiment, the non-enhanced braking mode applies a first level of braking force to the one or more towed vehicles of the combination vehicle in a predetermined reduced proportion relative to a commanded level of braking force applied to the towing vehicle of the combination vehicle. Also in the example embodiment, the enhanced braking mode applies a second level of braking force to the one or more towed vehicles of the combination vehicle greater than the first level of braking force.

Also in general and broadly in accordance with a further example embodiment, a brake control method for use with an associated towing vehicle towing one or more towed vehicles as a combination vehicle is provided using verification of reported trailer capabilities data. The braking control method receives at a controller first automatic configuration input operatively coupled with a processor a first automatic combination vehicle configuration signal comprising first combination vehicle configuration data representative of first combination vehicle configuration information provided by an associated source in operative communication with the associated towing vehicle. Similarly, a second automatic combination vehicle configuration signal is received at a controller second automatic configuration input operatively coupled with the processor. The second automatic combination vehicle configuration signal comprises second combination vehicle configuration data representative of second combination vehicle configuration information provided by the one or more towed vehicles of the combination vehicle. The first and second combination vehicle configuration data are stored in a memory operatively coupled with the processor, and control logic operatively coupled with the memory and executable by the processor performs a comparison between the first combination vehicle configuration data and the second combination vehicle configuration data to determine a comparison result. The logic determines a braking mode of the one or more towed vehicles of the combination vehicle as a one of an enhanced braking mode in accordance with a first comparison result of the comparison or a non-enhanced braking mode in accordance with a second comparison result of the comparison. In the example embodiment, the non-enhanced braking mode applies a first level of braking force to the one or more towed vehicles of the combination vehicle in a predetermined reduced proportion relative to a commanded level of braking force applied to the towing vehicle of the combination vehicle. Also in the example embodiment, the enhanced braking mode applies a second level of braking force to the one or more towed vehicles of the combination vehicle greater than the first level of braking force.

With continued reference to the method 1000 of FIG. 10, a first configuration report signal is received in step 1010 at the towing vehicle. An automatic configuration report signal is received from the one or more towed vehicles at step 1020. The control logic determines the configuration of the towed vehicles at step 1030 and a capability of the towed vehicles at step 1040.

The control logic determines an overall configuration and capability of the towed vehicles at step 1050. Then, based on the overall configuration and capability of the towed vehicles determined at step 1050, the control logic determines the braking strategy of the towed vehicles at step 1060.

Figure 11A:
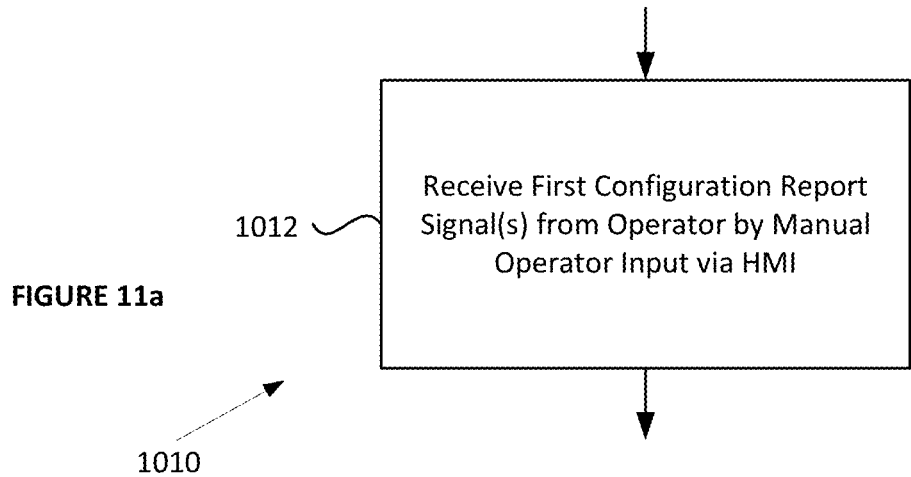
FIGS. 11a and 11b illustrate alternative details of the step of receiving configuration report signals from the towing vehicle.
Figure 11B:
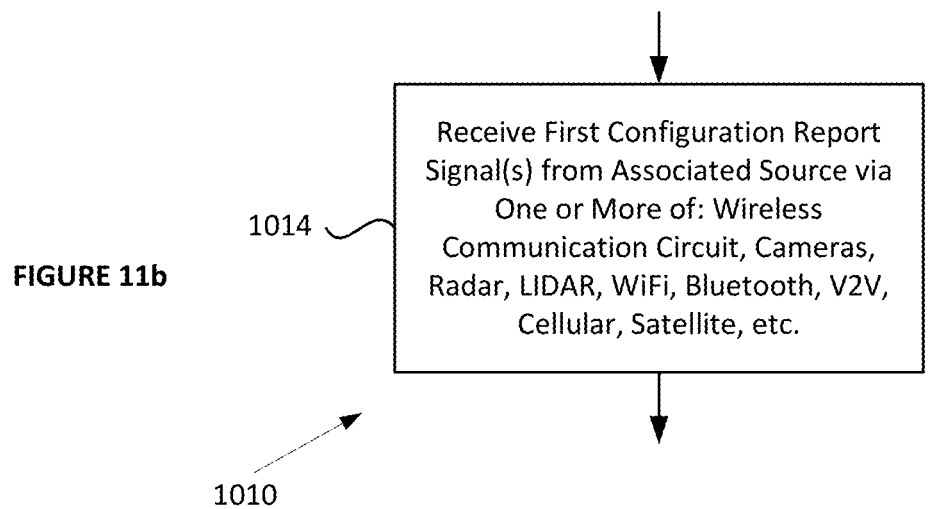

FIGS. 11a and 11b illustrate alternative details of the step of receiving configuration report signals from the towing vehicle. As described above and with reference next to FIG. 11a, in one embodiment the first configuration report signals are received from the operator of the towing vehicle by manual means. A controller manual configuration input comprises, in the example embodiment, a human interface circuit operatively coupled with the processor. The human interface circuit receives, from the associated operator of the associated towing vehicle, the manual combination vehicle configuration signal comprising the first combination vehicle configuration data representative of the first combination vehicle configuration information. Preferably, the human interface circuit comprises one or more of a touch screen disposed in the towing vehicle of the combination vehicle, a dashboard console disposed in the towing vehicle of the combination vehicle, a headliner console disposed in the towing vehicle of the combination vehicle, a cellular phone interface, and/or any other interface capable of receiving, from the associated operator of the associated towing vehicle, the manual combination vehicle configuration signal comprising the first combination vehicle configuration data representative of the first combination vehicle configuration information.

As further described above and with reference next to FIG. 11b, in another embodiment the first configuration report signals are received from an associated source by automatic means. A controller automatic configuration input comprises, in the example embodiment, an automatic interface circuit operatively coupled with the processor. The automatic interface circuit receives, from the associated operator of the associated towing vehicle, an automatic combination vehicle configuration signal comprising the first combination vehicle configuration data representative of the first combination vehicle configuration information. Preferably, the automatic interface circuit receives the first configuration report signal(s) from the associated source via one or more of: a wireless communication circuit, cameras, radar, LIDAR, WiFi, Bluetooth, V2V, Cellular, Satellite, ethernet, etc.

Figure 12A:
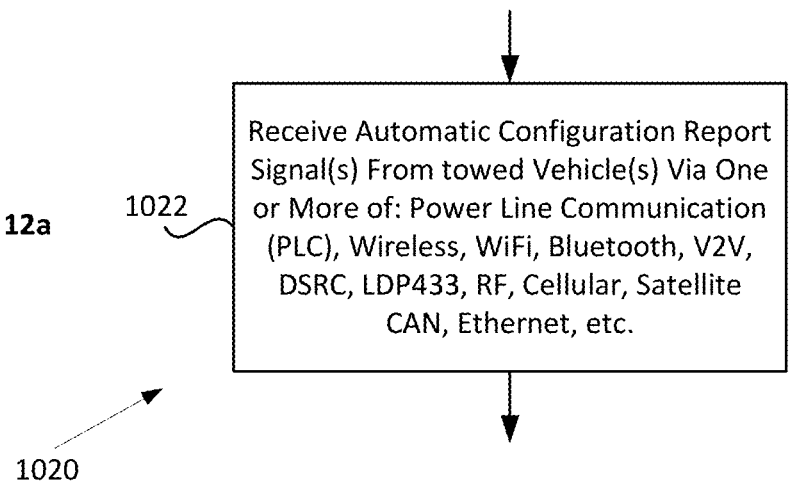
FIGS. 12a and 12b illustrate alternative details of the step of receiving the automatic configuration report signal from the one or more towed vehicles
Figure 12B:
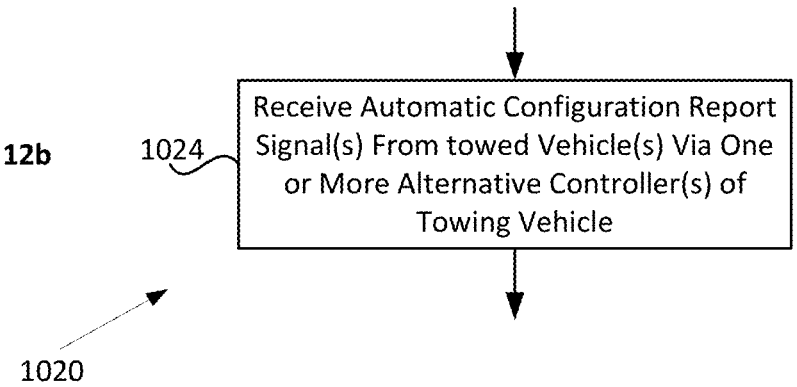
Figure 13A:
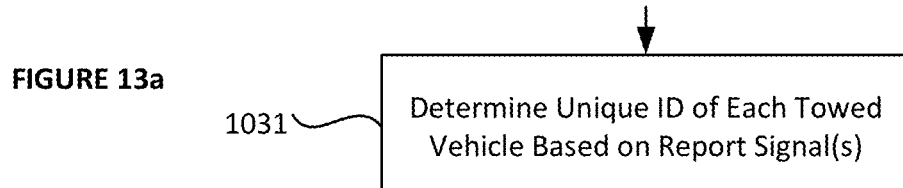
FIGS. 13a, 13b, and 13c illustrate alternative details of the step of the control logic determining the configuration of the towed vehicles
Figure 13B:
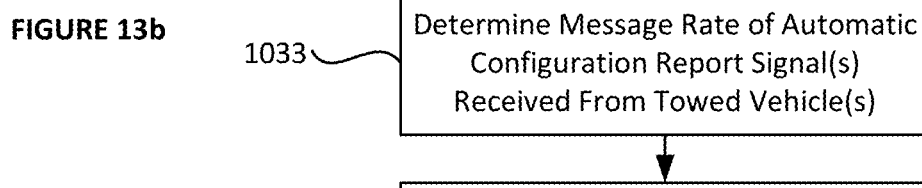
Figure 13C:
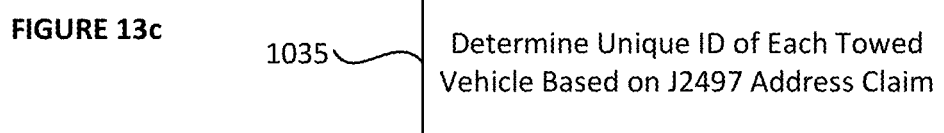

FIGS. 12a and 12b illustrate alternative details of the step of receiving the automatic configuration report signal from the one or more towed vehicles at step 1020 in the method 1000 outlined above. In one embodiment, the step 1020 of receiving the automatic configuration report signal from the one or more towed vehicles includes, as shown in FIG. 12a, includes receiving the automatic configuration report signal(s) from the towed vehicle(s) via one or more of: Power Line Communication (PLC), wireless, WiFi, Bluetooth, V2V, DSRC, LDP433, RF, Cellular, Satellite CAN, etc. In another embodiment, the step 1020 of receiving the automatic configuration report signal from the one or more towed vehicles includes, as shown in FIG. 12b, includes receiving the automatic configuration report signal(s) from the towed vehicle(s) via one or more intermediate, alternative, and/or proxy controller(s) of the towing vehicle such as, for example, a tire pressure (TPMS) monitoring system 224 as described above. In the example, the TPMS system communicates braking capability data and other information from the towed vehicle to the towing vehicle. This might be useful, for example, to provide redundancy and/or to enable the functionality of the example embodiments herein to vehicles having a TPMS, but without other communication systems. In an embodiment, an intermediate controller is in operative communication with the controller automatic configuration input and with an associated anti-lock braking system (ABS) controller. The intermediate controller is operative to receive a braking capability signal from the associated ABS controller and is further operative to deliver the braking capability signal to the controller automatic configuration input as the automatic combination vehicle configuration signal. Preferably, the braking capability signal includes any needed and/or useful information including towed vehicle configuration data representative of configuration information of the one or more towed vehicles. In an embodiment, the intermediate controller is a TPMS controller in operative communication with the controller automatic configuration input FIGS. 13a, 13b, and 13c illustrate alternative details of the step of the control logic determining the configuration of the towed vehicles at step 1030 in the method 1000 outlined above and, in particular, of determining a quantity of towed vehicles. In one embodiment, the step 1030 of the control logic determining the configuration of the towed vehicles includes, as shown in FIG. 13a, determining at step 1031 a unique ID of each towed vehicle based on the report signal(s) and, based on determining the unique ID of each towed vehicle, resolving at step 1032 the configuration of each towed vehicle.

In the example embodiment, the controller automatic configuration input receives the automatic combination vehicle configuration signal comprising one or more towed vehicle identification data representative of one or more unique identification values of the one or more towed vehicles of the combination vehicle. The control logic 231 is executable by the processor 230 to determine, from the one or more unique identification values, valid identification values of the towed vehicles comprising the one or more towed vehicles of the combination vehicle. The control logic is further executable by the processor to compare the valid identification values of the towed vehicles of the first combination vehicle configuration data with the unique IDs of each towed vehicle as contained in the report signal(s). The control logic selectively determines the non-enhanced braking mode of operation in accordance with a mismatching result of the comparison between the first and second IDs of the towed vehicles, and selectively determines the enhanced braking mode of operation in accordance with a matching result of the comparison between the first and second IDs of the towed vehicles.

Alternatively in the example embodiment, the controller automatic configuration input receives the automatic combination vehicle configuration signal comprising one or more towed vehicle identification data representative of one or more unique identification values of the one or more towed vehicles of the combination vehicle. The control logic 231 is executable by the processor 230 to determine, from the one or more unique identification values, valid identification values as a second quantity of towed vehicles comprising the one or more towed vehicles of the combination vehicle. The control logic is further executable by the processor to compare the first quantity of towed vehicles of the first combination vehicle configuration data with the second quantity of towed vehicles of the second combination vehicle configuration data. The control logic selectively determines the non-enhanced braking mode of operation in accordance with a mismatching result of the comparison between the first and second quantities of towed vehicles, and selectively determines the enhanced braking mode of operation in accordance with a matching result of the comparison between the first and second quantities of towed vehicles.

In another embodiment, the step 1030 of the control logic determining the configuration of the towed vehicles includes, as shown in FIG. 13b, includes determining at step 1033 a message rate of the automatic configuration report signal(s) received from the towed vehicle(s) and, based on determining the message rate of the automatic configuration report signal(s) received from the towed vehicle(s), resolving at step 1034 the configuration of each towed vehicle.

In the example embodiment, the controller automatic configuration input comprises a communication circuit receiving the automatic combination vehicle configuration signal at a first message rate. The control logic 231 is executable by the processor 230 to determine, determine, from the first message rate, a second quantity of towed vehicles comprising the one or more towed vehicles of the combination vehicle. The control logic is further executable by the processor to compare the first quantity of towed vehicles of the first combination vehicle configuration data with the second quantity of towed vehicles of the second combination vehicle configuration data. The control logic selectively determines the non-enhanced braking mode of operation in accordance with a mismatching result of the comparison between the first and second quantities of towed vehicles, and selectively determines the enhanced braking mode of operation in accordance with a matching result of the comparison between the first and second quantities of towed vehicles.

In one example embodiment, the communication circuit of the braking controller includes one or more of a power line communication (PLC) circuit, an Ethernet network communication circuit, and/or a controller area network (CAN) communication circuit receiving the automatic combination vehicle configuration signal at the first message rate. In another example embodiment, the communication circuit of the braking controller includes a wireless communication circuit wirelessly receiving the automatic combination vehicle configuration signal at the first message rate, wherein the wireless communication circuit may include one or more of a wireless networking WiFi communication circuit, a wireless Bluetooth communication circuit, a wireless dedicated short range communications (DSRC) communication circuit, an LDP433 communication circuit, a radio frequency (RF) communication circuit, a wireless cellular communication circuit, and/or a wireless satellite communication circuit.

In another embodiment, the step 1030 of the control logic determining the configuration of the towed vehicles includes, as shown in FIG. 13c, determining at step 1035 a unique ID of each towed vehicle based on a J2497 address claim and, based on determining the number of claimed J2497 addresses, resolving at step 1036 a quantity of the towed vehicles. In the example embodiment, the controller automatic configuration input includes a communication circuit configured to receive the automatic configuration signal as one or more J2497 Standard signals corresponding to the one or more towed vehicles. The one or more J2497 Standard signals comprise one or more J2497 address claims made to one or more address identifiers by the one or more towed vehicles of the combination vehicle. The control logic 231 is executable by the processor 230 to determine a unique ID of each towed vehicle based on the J2497 address claim, determine from the quantity of claimed J2497 addresses a second quantity of towed vehicles comprising the one or more towed vehicles of the combination vehicle, and compare the first quantity of towed vehicles of the first combination vehicle configuration data received from either the towing vehicle operator or the from the towed vehicles with the second quantity of towed vehicles of the second combination vehicle configuration data. The control logic is further operable to selectively determine the non-enhanced braking mode of operation in accordance with a mismatching result of the comparison between the first and second quantities of towed vehicles, and selectively determine the enhanced braking mode of operation in accordance with a matching result of the comparison between the first and second quantities of towed vehicles.

FIGS. 14a and 14b illustrate alternative details of the step of the control logic determining the capabilities of the towed vehicles at step 1040 in the method 1000 outlined above. In one embodiment, the step 1040 of the control logic determining the capabilities of the towed vehicles includes, as shown in FIG. 14a, determining at step 1041 an equipment capability of each towed vehicle based on the report signal(s) and, based on determining the equipment capability of each towed vehicle, resolving at step 1042 the configuration of each towed vehicle.

In the example embodiment, the controller automatic configuration input receives the automatic combination vehicle configuration signal comprising one or more towed vehicle identification data representative of one or more the controller manual configuration input receives the manual combination vehicle configuration signal comprising the first combination vehicle configuration data representative of a first equipment capabilities parameter of the one or more towed vehicles of the combination vehicle. The controller automatic configuration input further receives the automatic combination vehicle configuration signal comprising the second combination vehicle configuration data representative of a second equipment capabilities parameter of the one or more towed vehicles of the combination vehicle. In the example embodiment, the control logic 231 is executable by the processor 230 to compare the first equipment capabilities parameter with the second equipment capabilities parameter. The control logic then selectively determines the non-enhanced or the enhanced braking mode of operation in accordance with a result of the comparison. The control logic selectively determines the enhanced mode of operation in accordance with the second equipment capabilities parameter meeting or exceeding the first equipment capabilities parameter. Conversely, the control logic selectively determines the non-enhanced mode of operation in accordance with the second equipment capabilities parameter failing to meet or exceed the first equipment capabilities parameter.

Also in the example embodiment, the control logic is executable by the processor to compare the first and second equipment capabilities parameters, wherein the first and second equipment capabilities parameters may comprise one or more of a number of axles among the one or more towed vehicles of the combination vehicle, a towed vehicle load among the one or more towed vehicles of the combination vehicle, an axle load among the one or more towed vehicles of the combination vehicle, a number of wheel ends among the one or more towed vehicles of the combination vehicle, a number of wheel speed sensors among the one or more towed vehicles of the combination vehicle, and/or a number of brake modulators among the one or more towed vehicles of the combination vehicle.

In another embodiment, the step 1040 of the control logic determining the capabilities of the towed vehicles includes, as shown in FIG. 14b, determining at step 1043 equipment health data of each of the towed vehicles and, based on determined health data received from the towed vehicle(s), resolving at step 1044 the configuration of each towed vehicle.

In the example embodiment, the non-transient memory device stores towed vehicle expected health data as the first combination vehicle configuration data. The towed vehicle expected health data is representative of a predetermined functional operability threshold value needed for participation by the one or more towed vehicles in the enhanced braking mode. The controller automatic configuration input receives from the one or more towed vehicles the automatic combination vehicle configuration signal comprising the second combination vehicle configuration data as automatic towed vehicle health data representative of one or more functional operability values of the one or more towed vehicles comprising the combination vehicle. The control logic 231 is executable by the processor 230 to compare the automatic towed vehicle health data with the towed vehicle expected health data. The control logic selectively determines the non-enhanced braking mode of operation in accordance with a functional operability value of any of the one or more towed vehicles comprising the combination vehicle being less than the predetermined functional operability threshold value, and selectively determines the enhanced braking mode of operation in accordance with the functional operability value of all of the one or more towed vehicles comprising the combination vehicle being the same or greater than the predetermined functional operability threshold value.

In the example embodiment the equipment health data may include towed vehicle expected anti-lock braking system (ABS) health data representative of a predetermined functional ABS operability threshold value needed for participation by the one or more towed vehicles in the enhanced braking mode. The non-transient memory device 240 stores the towed vehicle expected ABS health data. The controller automatic configuration input receives from the one or more towed vehicles the automatic combination vehicle configuration signal comprising the second combination vehicle configuration data as automatic towed vehicle ABS health data representative of one or more functional ABS operability values of the one or more towed vehicles comprising the combination vehicle. The control logic is executable by the processor to compare the automatic towed vehicle ABS health data with the towed vehicle expected ABS health data. The control logic is further operable to selectively determine the non-enhanced braking mode of operation in accordance with a functional ABS operability value of any of the one or more towed vehicles comprising the combination vehicle being less than the predetermined functional ABS operability threshold value, and selectively determine the enhanced braking mode of operation in accordance with the functional ABS operability value of all of the one or more towed vehicles comprising the combination vehicle being the same or greater than the predetermined functional ABS operability threshold value.

Figure 15:
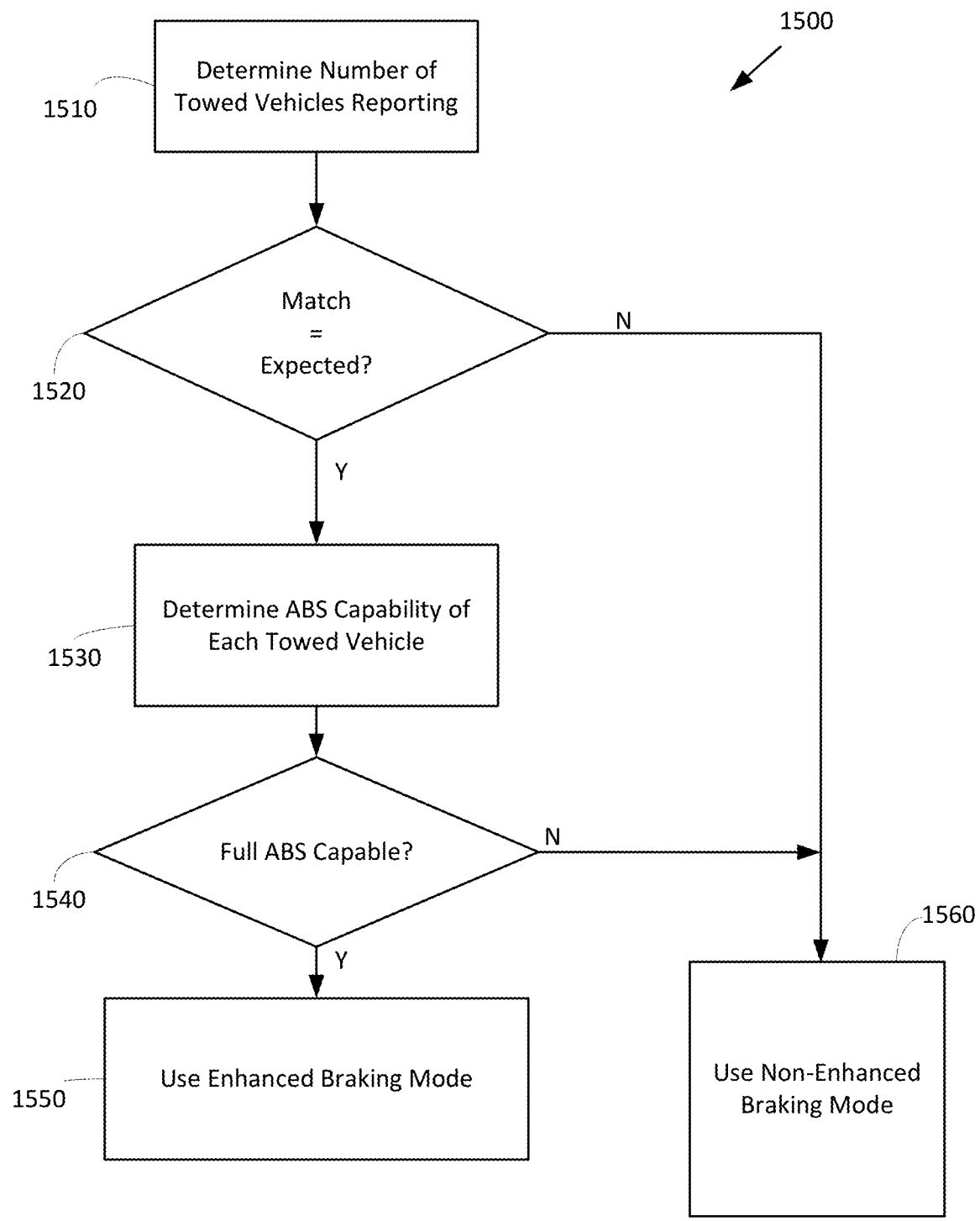
FIG. 15 is a flow diagram showing a method of implementing a trailer braking control strategy for platooning using verification of reported trailer capabilities in accordance with an example embodiment

FIG. 15 is a flow diagram showing a method 1500 of implementing a trailer braking control strategy using verification of reported trailer capabilities in accordance with an example embodiment. The method 1500 includes an initial step 1510 of determining a number of towed vehicles. In one example embodiment, a controller manual configuration input receives from an associated operator a manual combination vehicle configuration signal comprising first combination vehicle configuration data representative of a first quantity of towed vehicles comprising one or more towed vehicles of a combination vehicle, and a controller automatic configuration input receives from the one or more towed vehicles an automatic combination vehicle configuration signal comprising second combination vehicle configuration data representative of a second quantity of towed vehicles comprising the one or more towed vehicles of the combination vehicle. In another example embodiment, a controller first automatic configuration input receives from an associated source a first automatic combination vehicle configuration signal comprising first combination vehicle configuration data representative of a first quantity of towed vehicles comprising one or more towed vehicles of a combination vehicle, and a controller second automatic configuration input receives from the one or more towed vehicles a second automatic combination vehicle configuration signal comprising second combination vehicle configuration data representative of a second quantity of towed vehicles comprising the one or more towed vehicles of the combination vehicle.

The method determines at step 1520 a verification of a matching between the information reported by the one or more towed vehicles relative to the manual or automatic information provided by the towing vehicle operator of by an associated source. In the example embodiment, the control logic is executable by the processor to compare the first quantity of towed vehicles of the first combination vehicle configuration data with the second quantity of towed vehicles of the second combination vehicle configuration data. The controller selectively determines the non-enhanced braking mode of operation in accordance with a mismatching result of the comparison between the first and second quantities of towed vehicles, and generates a non-enhanced braking signal at step 1560.

The controller automatic configuration input may receive the automatic combination vehicle configuration signal as a null automatic combination vehicle configuration signal without the second combination vehicle configuration data representative of the second configuration information. In this case, the control logic is executable by the processor to determine the non-enhanced braking mode of operation 1560 in accordance with the controller automatic configuration input receiving the null automatic combination vehicle configuration signal.

The ABS capability of each of the one or more towed vehicles is determined at step 1530 and a determination is made at step 1540 whether all of the one or more towed vehicles are ABS capable. The controller is operable to selectively determine the enhanced braking mode of operation 1550 in accordance with a matching result of the comparison between the first and second quantities of towed vehicles and the determination of ABS capabilities of each of the towed vehicles.

In addition, the control logic stored in the non-transient memory device is executable by the processor in accordance with a further example embodiment to determine one or more platooning operational parameters of the combination vehicle in accordance with the determined braking mode of the one or more towed vehicles of the combination vehicle. The control logic determines a platooning following distance to be maintained by the towing vehicle relative to an associated vehicle forward of the towing vehicle as a one or more of the platooning operational parameters in accordance with the determined braking mode by increasing the platooning following distance in step 1560 responsive to the non-enhanced braking mode being determined and by decreasing the platooning following distance in step 1550 responsive to the enhanced braking mode being determined. Further, the control logic may selectively determine an adjustment to a following distance being maintained by the towing vehicle in accordance with the determined braking mode. In this example embodiment, the following distance being maintained may be increased in step 1560 responsive to the non-enhanced braking mode being determined. Conversely, the following distance being maintained may be decreased in step 1550 responsive to the enhanced braking mode being determined.

Further, the control logic may selectively determine an adjustment to a platooning travel speed limit being maintained by the towing vehicle as a one or more of the platooning operational parameters in accordance with the determined braking mode. In this example embodiment, the platooning travel speed limit being maintained may be decreased in step 1560 responsive to the non-enhanced braking mode being determined. Conversely, the platooning travel speed limit being maintained may be increased in step 1550 responsive to the enhanced braking mode being determined.

Yet still further, the control logic determines a platooning participation gate of the towing vehicle as a one or more of the platooning operational parameters in accordance with the determined braking mode by not permitting the platooning participation in step 1560 responsive to the non-enhanced braking mode being determined and by permitting the platooning participation in step 1550 responsive to the enhanced braking mode being determined.

Figure 16:
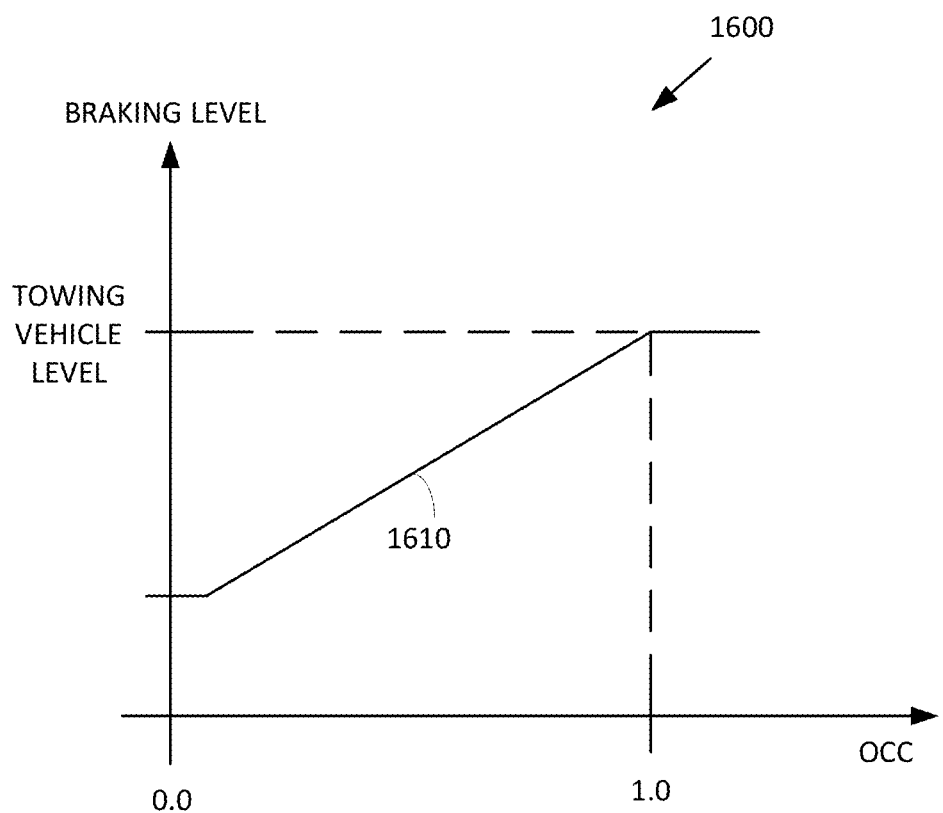
FIG. 16 is a graphical representation 1600 of a variable braking control level 1610 applied to the one or more trailer vehicles relative to the towing vehicle in accordance with the embodiments herein.

FIG. 16 is a graphical representation 1600 of a variable braking control level 1610 applied to the one or more trailer vehicles relative to the towing vehicle in accordance with the embodiments herein. As described, in the embodiments herein, a brake control output operatively coupled with the processor 230 (FIG. 2) is configured to deliver brake pressure to the one or more towed vehicles in response to an actuator control signal 58 (FIG. 1) delivered to the associated brake control actuator 34 via the brake control output. The control logic 231 is operable to implement the enhanced braking mode of operation by controlling the actuator control signal to one or more of increase a high pulse time of a modulated brake pressure applied by the towing vehicle to the one or more towed vehicles via the associated brake control actuator, decrease a low pulse time of the modulated brake pressure applied by the towing vehicle to the one or more towed vehicles via the associated brake control actuator, and/or increase values of one or more pulses of the modulated brake pressure applied by the towing vehicle to the one or more towed vehicles via the associated brake control actuator.

Figure 17A:
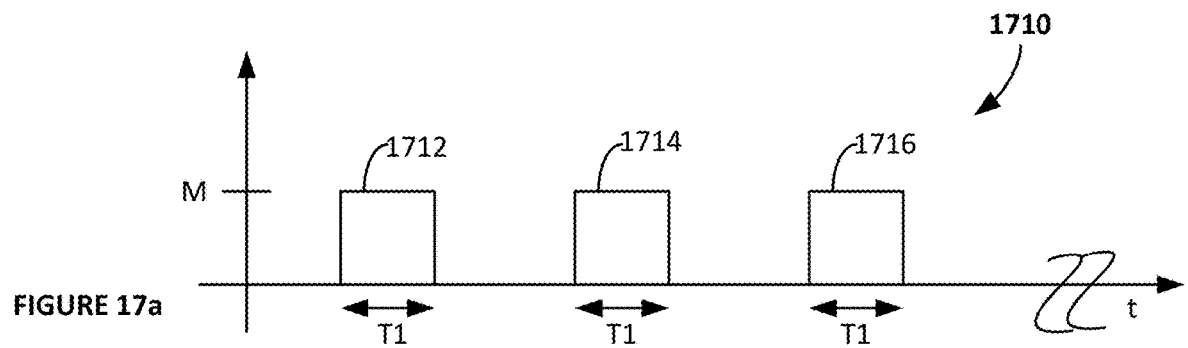
FIGS. 17a-17c illustrate a technique for transitioning trailer braking control from a non-enhanced or normal operational trailer braking mode to an enhanced operational mode by varying by increasing a pulse ON time that a brake command signal is generated by the towing vehicle controller of FIG. 1 and delivered to the one or more trailing unit(s) of the towing and towed vehicle combination of FIG. 3 in accordance with an example embodiment.
Figure 17B:
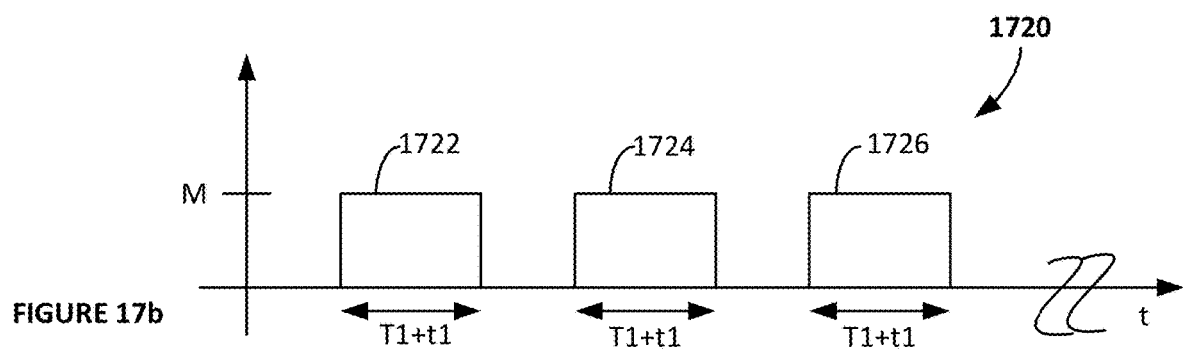
Figure 17C:
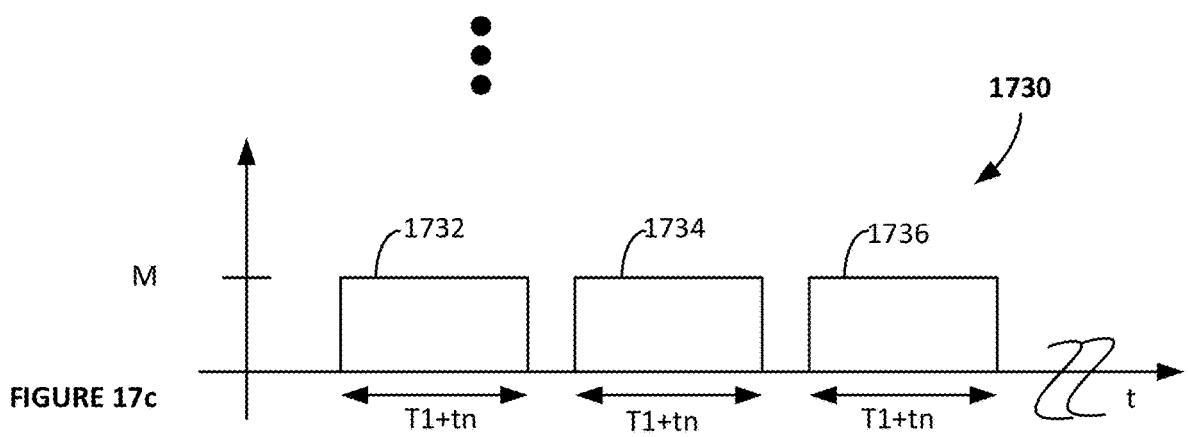

FIGS. 17a-17c illustrate a technique for transitioning trailer braking control from a non-enhanced or normal operational trailer braking mode to an enhanced operational mode by varying by increasing a pulse ON time that a brake command signal is generated by the towing vehicle controller of FIG. 1 and delivered to the one or more trailing unit(s) of the towing and towed vehicle combination of FIG. 3 in accordance with an example embodiment.

The towing vehicle controller 22 according to the example embodiment is operable to implement the enhanced braking mode of operation by increasing a high or ON pulse time of the modulated full brake pressure applied by the towing vehicle to the towed vehicle in the non-enhanced braking mode of operation. For example, the towing vehicle controller 22 according to the example embodiment is operable to implement the enhanced braking mode of operation by increasing a high or ON pulse time from having a pulse period of T1 and an amplitude of M as shown in FIG. 17a, to having a pulse period of (T1+t1) and an amplitude of M as shown in FIG. 17b. The towing vehicle controller 22 according to the example embodiment is further operable to implement the enhanced braking mode of operation by increasing the high or ON pulse time from having the pulse period of (T1+t1) and the amplitude of M as shown in FIG. 17b to having a pulse period of (T1+tn) and the amplitude of M as shown in FIG. 17c.

Figure 18A:
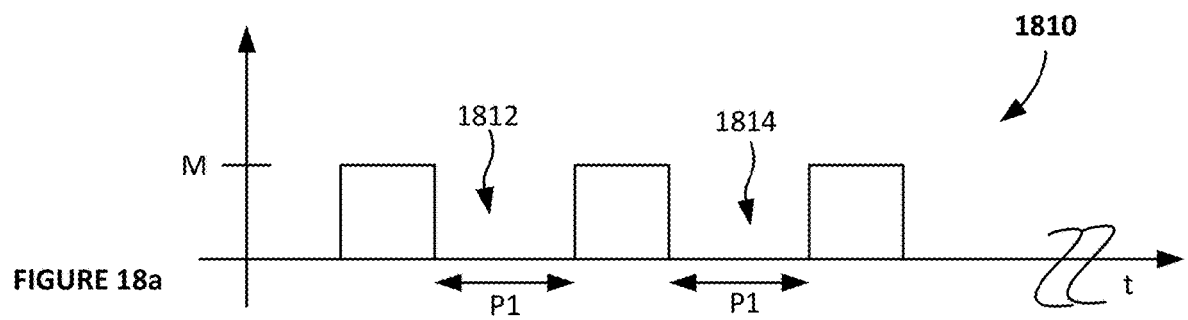
FIGS. 18a-18c illustrate a technique for transitioning trailer braking control from a non-enhanced or normal operational trailer braking mode to an enhanced operational mode by varying by decreasing a pulse OFF time that a brake command signal is generated by the towing vehicle controller of FIG. 1 and delivered to the one or more trailing unit(s) of the towing and towed vehicle combination of FIG. 3 in accordance with an example embodiment.
Figure 18B:
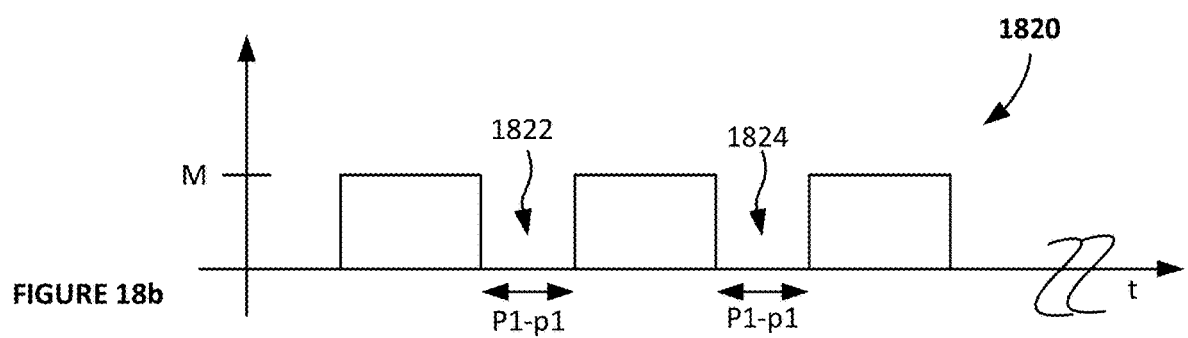
Figure 18C:
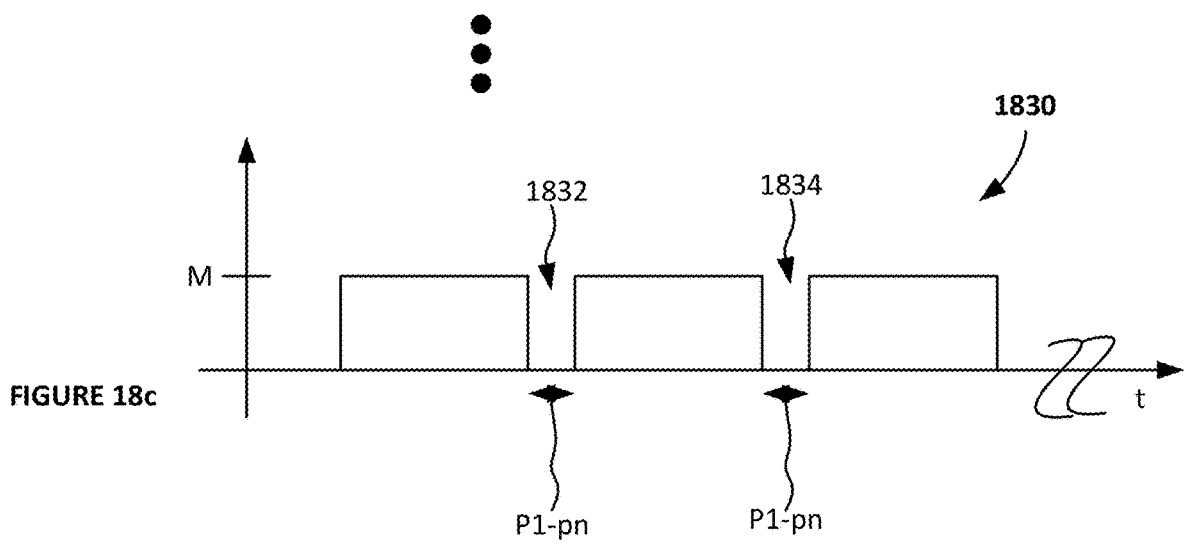

FIGS. 18a-18c illustrate a technique for transitioning trailer braking control from a non-enhanced or normal operational trailer braking mode to an enhanced operational mode by varying by decreasing a pulse OFF time that a brake command signal is generated by the towing vehicle controller of FIG. 1 and delivered to the one or more trailing unit(s) of the towing and towed vehicle combination of FIG. 3 in accordance with an example embodiment.

The towing vehicle controller 22 according to the example embodiment is operable to implement the enhanced braking mode of operation by decreasing a low or OFF pulse time of the modulated full brake pressure applied by the towing vehicle to the towed vehicle in the non-enhanced braking mode of operation. For example, the towing vehicle controller 22 according to the example embodiment is operable to implement the enhanced braking mode of operation by decreasing a low or OFF pulse time from having a low or OFF pulse period of P1 and an amplitude of M as shown in FIG. 18a, to having a low of OFF pulse period of (P1+p1) and an amplitude of M as shown in FIG. 18b. The towing vehicle controller 22 according to the example embodiment is further operable to implement the enhanced braking mode of operation by decreasing the low or OFF pulse time from having the pulse period of (P1+p1) and the amplitude of M as shown in FIG. 18b to having a pulse period of (P1+pn) and the amplitude of M as shown in FIG. 18c.

Figure 19A:
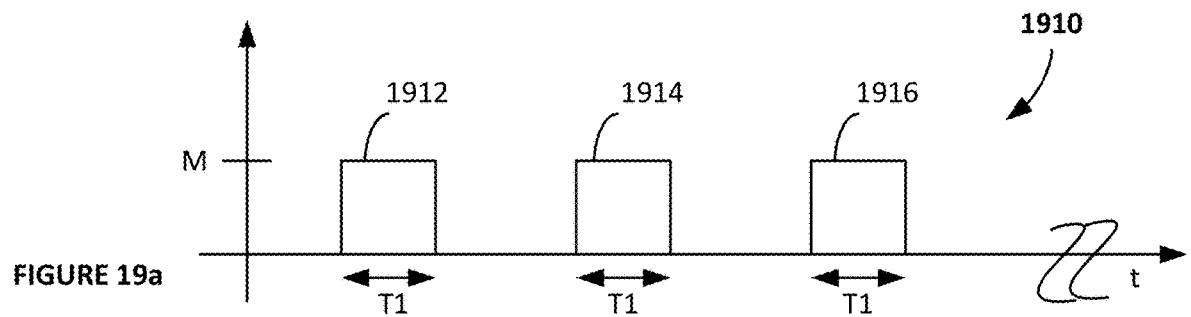
FIG. 19a illustrates a technique for providing a non-enhanced or normal operational trailer braking mode by generating a series of similar brake control pulses at regular intervals by the towing vehicle controller of FIG. 1 and delivered to the one or more trailing unit(s) of the towing and towed vehicle combination of FIG. 3 in accordance with an example embodiment.

FIG. 19a illustrates a technique for providing a non-enhanced or normal operational trailer braking mode by generating a series of similar brake control pulses at regular intervals by the towing vehicle controller of FIG. 1 and delivered to the one or more trailing unit(s) of the towing and towed vehicle combination of FIG. 3 in accordance with an example embodiment.

Figure 19B:
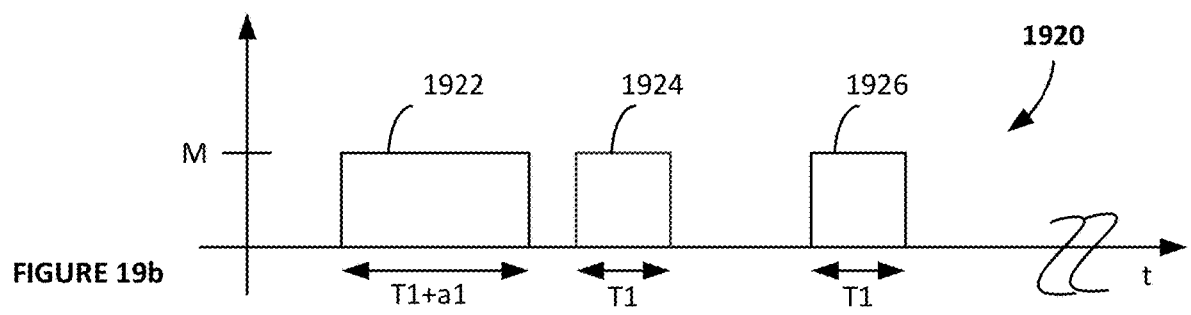
FIG. 19b illustrates a technique for transitioning trailer braking control from a non-enhanced or normal operational trailer braking mode to an enhanced operational mode by varying by increasing an initial pulse ON time that a brake command signal is generated by the towing vehicle controller of FIG. 1 and delivered to the one or more trailing unit(s) of the towing and towed vehicle combination of FIG. 3 in accordance with an example embodiment.

FIG. 19b illustrates a technique for transitioning trailer braking control from a non-enhanced or normal operational trailer braking mode to an enhanced operational mode by varying by increasing an initial pulse ON time that a brake command signal is generated by the towing vehicle controller of FIG. 1 and delivered to the one or more trailing unit(s) of the towing and towed vehicle combination of FIG. 3 in accordance with an example embodiment.

The towing vehicle controller 22 according to the example embodiment is operable to implement the enhanced braking mode of operation by increasing a high or ON pulse time of the modulated full brake pressure applied by the towing vehicle to the towed vehicle in the non-enhanced braking mode of operation. For example, the towing vehicle controller 22 according to the example embodiment is operable to implement the enhanced braking mode of operation by increasing a high or ON pulse time from having a pulse period of T1 and an amplitude of M as shown in FIG. 19a, to having a pulse period for a first pulse of (T1+at1) and an amplitude of M and having a pulse period of T1 and an amplitude of M for subsequent pulses as shown in FIG. 19b. The towing vehicle controller 22 according to the example embodiment is further operable to implement the enhanced braking mode of operation by increasing the high or ON pulse time for plural initial pulses from having the pulse period of T1 and the amplitude of M as shown in FIG. 19a to having a pulse period of T1+al as may be necessary or desired to suitably effect the transition from the non-enhanced braking mode of operation to the enhanced braking mode of operation.

Figure 19C:
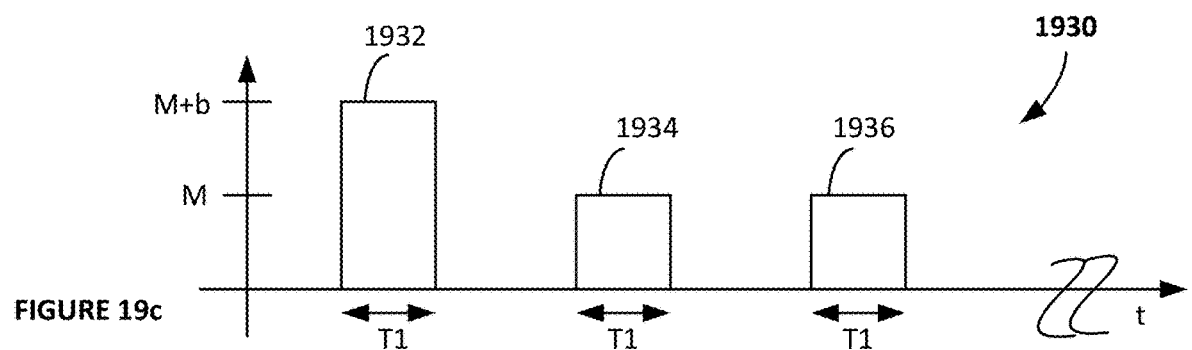
FIG. 19c illustrates a technique for transitioning trailer braking control from a non-enhanced or normal operational trailer braking mode to an enhanced operational mode by varying by increasing an initial pulse amplitude during an ON time that a brake command signal is generated by the towing vehicle controller of FIG. 1 and delivered to the one or more trailing unit(s) of the towing and towed vehicle combination of FIG. 3 in accordance with an example embodiment.

FIG. 19c illustrates a technique for transitioning trailer braking control from a non-enhanced or normal operational trailer braking mode to an enhanced operational mode by varying by increasing an initial pulse amplitude during an ON time that a brake command signal is generated by the towing vehicle controller of FIG. 1 and delivered to the one or more trailing unit(s) of the towing and towed vehicle combination of FIG. 3 in accordance with an example embodiment. For example, the towing vehicle controller 22 according to the example embodiment is operable to implement the enhanced braking mode of operation by increasing the pulse amplitude for the initial pulse from having an amplitude of M and a period of T1 as shown in FIG. 19a, to having an amplitude of (M+b) and having a pulse period of T1 as shown in FIG. 19c. The towing vehicle controller 22 according to the example embodiment is further operable to implement the enhanced braking mode of operation by increasing the pulse amplitude of M as shown in FIG. 19a to having the pulse amplitude of (M+b) for plural initial pulses as may be necessary or desired to suitably effect the transition from the non-enhanced braking mode of operation to the enhanced braking mode of operation.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A braking controller for use in an associated towing vehicle towing one or more towed vehicles as a combination vehicle, the braking controller comprising:
   a processor;
   a controller first automatic configuration input operatively coupled with the processor, the controller first automatic configuration input being operable to receive a first automatic trailer capability signal from an associated source external to the associated combination vehicle and external to the braking controller, the first automatic trailer capability signal comprising first trailer configuration data representative of an expected first value of an equipment parameter of the one or more towed vehicles of the combination vehicle provided by the associated source in operative communication with the associated towing vehicle;
   a controller second automatic configuration input operatively coupled with the processor, the controller second automatic configuration input being operable to receive a second automatic trailer capability signal provided by the one or more towed vehicles, the second automatic trailer capability signal comprising second trailer configuration data representative of a reported second value of the equipment parameter of the one or more towed vehicles of the combination vehicle;
   a non-transient memory device operatively coupled with the processor, the non-transient memory device storing the first and second trailer configuration data; and
   control logic stored in the non-transient memory device and executable by the processor to:
      perform a comparison between the first trailer configuration data and the second trailer configuration data to determine a comparison result; and
      determine a braking mode of the one or more towed vehicles of the combination vehicle as a one of an enhanced braking mode in accordance with a first comparison result of the comparison or a non-enhanced braking mode in accordance with a second comparison result of the comparison, the first comparison result being different than the second comparison, wherein the non-enhanced braking mode applies a first level of braking force to the one or more towed vehicles of the combination vehicle in a predetermined reduced proportion relative to a commanded level of braking force applied to the towing vehicle of the combination vehicle, wherein the enhanced braking mode applies a second level of braking force to the one or more towed vehicles of the combination vehicle greater than the first level of braking force.

2. The braking controller according to claim 1, further comprising:

a controller deceleration command input operatively coupled with the processor, the controller deceleration command input receiving a deceleration command signal comprising deceleration command data representative of a deceleration command level to be achieved by the combination vehicle, wherein the control logic is operable to, responsive to receiving the deceleration command signal:

selectively generate, based on the first comparison result of the comparison between the first and second trailer configuration data, a first brake control transmission signal to effect the deceleration command level in accordance with the non-enhanced braking mode of operation; and selectively generate, based on the second comparison result of the comparison between the first and second trailer configuration data, a second brake control transmission signal to effect the deceleration command level in accordance with the enhanced braking mode of operation.

3. The braking controller according to claim 2, further comprising:

a controller brake signal output operatively coupled with the processor, the controller brake signal output selectively transmitting a one of the first or second brake control transmission signals to the one or more towed vehicles of the combination vehicle.

4. The braking controller according to claim 1, wherein:

the controller first automatic configuration input receives the first automatic trailer capability signal comprising the first trailer configuration data representative of a first quantity of towed vehicles comprising the one or more towed vehicles of the combination vehicle as the expected first value of the equipment parameter of the one or more towed vehicles;

the controller second automatic configuration input receives the second automatic trailer capability signal comprising the second trailer configuration data representative of a second quantity of towed vehicles comprising the one or more towed vehicles of the combination vehicle as the reported second value of the equipment parameter of the one or more towed vehicles; and the control logic is executable by the processor to:

compare the first quantity of towed vehicles of the first trailer configuration data with the second quantity of towed vehicles of the second trailer configuration data;

selectively determine the non-enhanced braking mode of operation in accordance with a non-correspondence between the first and second quantities of towed vehicles; and selectively determine the enhanced braking mode of operation in accordance with a correspondence between the first and second quantities of towed vehicles.

5. The braking controller according to claim 4, wherein:

the controller second automatic configuration input receives the second automatic trailer capability signal comprising one or more towed vehicle identification data representative of one or more unique identification values of the one or more towed vehicles of the combination vehicle; and the control logic is executable by the processor to:

determine, from the one or more unique identification values, valid identification values as a second quantity of towed vehicles comprising the one or more towed vehicles of the combination vehicle;

compare the first quantity of towed vehicles of the first trailer configuration data with the second quantity of towed vehicles of the second trailer configuration data;

selectively determine the non-enhanced braking mode of operation in accordance with a mismatching result of the comparison between the first and second quantities of towed vehicles; and selectively determine the enhanced braking mode of operation in accordance with a matching result of the comparison between the first and second quantities of towed vehicles.

6. The braking controller according to claim 4, wherein:

the controller second automatic configuration input comprises a communication circuit receiving the second automatic trailer capability signal at a first message rate; and the control logic is executable by the processor to:

determine, from the first message rate, a second quantity of towed vehicles comprising the one or more towed vehicles of the combination vehicle;

compare the first quantity of towed vehicles of the first trailer configuration data with the second quantity of towed vehicles of the second trailer configuration data;

selectively determine the non-enhanced braking mode of operation in accordance with a mismatching result of the comparison between the first and second quantities of towed vehicles; and selectively determine the enhanced braking mode of operation in accordance with a matching result of the comparison between the first and second quantities of towed vehicles.

7. The braking controller according to claim 6, wherein:

the communication circuit comprises one or more of a power line communication (PLC) circuit, an Ethernet network communication circuit, and/or a controller area network (CAN) communication circuit receiving the second automatic trailer capability signal at the first message rate.

8. The braking controller according to claim 6, wherein:

the communication circuit comprises a wireless communication circuit wirelessly receiving the second automatic trailer capability signal at the first message rate, the wireless communication circuit comprising one or more of:

a wireless networking WiFi communication circuit receiving wireless WiFi signals;

a wireless Bluetooth communication circuit receiving wireless Bluetooth signals;

a wireless dedicated short range communications (DSRC) communication circuit receiving wireless DSRC signals;
an LDP433 communication circuit receiving wireless LDP433 signals;
a radio frequency (RF) communication circuit receiving RF signals;
a wireless cellular communication circuit receiving wireless cellular communication signals; and/or
a wireless satellite communication circuit receiving wireless satellite communication signals.

9. The braking controller according to claim 4, wherein:
the controller second automatic configuration input comprises a communication circuit configured to receive the second automatic trailer capability signal as one or more J2497 Standard signals corresponding to the one or more towed vehicles, the one or more J2497 Standard signals comprising one or more J2497 address claims made to one or more address identifiers by the one or more towed vehicles of the combination vehicle; and
the control logic is executable by the processor to:
  determine a count of one or more claimed J2497 addresses;
  determine, from the count of the one or more address identifiers, a second quantity of towed vehicles comprising the one or more towed vehicles of the combination vehicle;
  compare the first quantity of towed vehicles of the first combination vehicle configuration data with the second quantity of towed vehicles of the second combination vehicle configuration data;
  selectively determine the non-enhanced braking mode of operation in accordance with a mismatching result of the comparison between the first and second quantities of towed vehicles; and
  selectively determine the enhanced braking mode of operation in accordance with a matching result of the comparison between the first and second quantities of towed vehicles.

10. The braking controller according to claim 1, wherein:
the non-transient memory device stores towed vehicle expected health data as the first trailer configuration data, the towed vehicle expected health data being representative of a predetermined functional operability threshold value needed for participation by the one or more towed vehicles in the enhanced braking mode;
the controller second automatic configuration input receives from the one or more towed vehicles the second automatic trailer capability signal comprising the second trailer configuration data as automatic towed vehicle health data representative of one or more functional operability values of the one or more towed vehicles comprising the combination vehicle; and
the control logic is executable by the processor to:
  compare the automatic towed vehicle health data with the towed vehicle expected health data;
  selectively determine the non-enhanced braking mode of operation in accordance with a functional operability value of any of the one or more towed vehicles comprising the combination vehicle being less than the predetermined functional operability threshold value; and
  selectively determine the enhanced braking mode of operation in accordance with the functional operability value of all of the one or more towed vehicles comprising the combination vehicle being the same or greater than the predetermined functional operability threshold value.

11. The braking controller according to claim 10, wherein:
the non-transient memory device stores towed vehicle expected anti-lock braking system (ABS) health data as the towed vehicle expected health data, the towed vehicle expected anti-lock braking system (ABS) health data being representative of a predetermined functional (ABS) operability threshold value needed for participation by the one or more towed vehicles in the enhanced braking mode;
the controller second automatic configuration input receives from the one or more towed vehicles the second automatic trailer capability signal comprising the second trailer configuration data as automatic towed vehicle ABS health data representative of one or more functional ABS operability values of the one or more towed vehicles comprising the combination vehicle; and
the control logic is executable by the processor to:
  compare the automatic towed vehicle ABS health data with the towed vehicle expected ABS health data;
  selectively determine the non-enhanced braking mode of operation in accordance with a functional ABS operability value of any of the one or more towed vehicles comprising the combination vehicle being less than the predetermined functional ABS operability threshold value; and
  selectively determine the enhanced braking mode of operation in accordance with the functional ABS operability value of all of the one or more towed vehicles comprising the combination vehicle being the same or greater than the predetermined functional ABS operability threshold value.

12. The braking controller according to claim 1, wherein:
the non-transient memory device stores first equipment capabilities data as the first trailer configuration data, the first equipment capabilities data being representative of a predetermined equipment capability threshold value needed for participation by the one or more towed vehicles in the enhanced braking mode;
the controller second automatic configuration input receives from the one or more towed vehicles the second automatic trailer capability signal comprising the second trailer configuration data as automatic equipment capabilities data representative of one or more equipment capability values of the one or more towed vehicles comprising the combination vehicle; and
the control logic is executable by the processor to:
  compare the first equipment capabilities data with the automatic equipment capabilities data;
  selectively determine the non-enhanced braking mode of operation in accordance with an equipment capability value of any of the one or more towed vehicles comprising the combination vehicle being less than the predetermined equipment capability threshold value; and
  selectively determine the enhanced braking mode of operation in accordance with the equipment capability value of all of the one or more towed vehicles comprising the combination vehicle being the same or greater than the predetermined equipment capability threshold value.

13. The braking controller according to claim 12, wherein:
the control logic is executable by the processor to compare the predetermined equipment capability threshold value with the one or more equipment capability values of the one or more towed vehicles comprising one or more of:
a number of axles among the one or more towed vehicles of the combination vehicle;
a towed vehicle load among the one or more towed vehicles of the combination vehicle;
an axle load among the one or more towed vehicles of the combination vehicle;
a number of wheel ends among the one or more towed vehicles of the combination vehicle;
a number of wheel speed sensors among the one or more towed vehicles of the combination vehicle; and/or
a number of brake modulators among the one or more towed vehicles of the combination vehicle.

14. The braking controller according to claim 1, wherein:
the controller second automatic configuration input comprises a wireless communication circuit configured to receive the second automatic trailer capability signal as one or more wireless signals corresponding to the one or more towed vehicles.

15. The braking controller according to claim 14, wherein:
the wireless communication circuit comprises one or more of:
a wireless networking WiFi communication circuit receiving wireless WiFi signals;
a wireless Bluetooth communication circuit receiving wireless Bluetooth signals;
a wireless dedicated short range communications (DSRC) communication circuit receiving wireless DSRC signals;
an LDP433 communication circuit receiving wireless LDP433 signals;
a radio frequency (RF) communication circuit receiving RF signals;
a wireless cellular communication circuit receiving wireless cellular communication signals; and/or
a wireless satellite communication circuit receiving wireless satellite communication signals.

16. The braking controller according to claim 1, wherein:
the controller second automatic configuration input comprises a wired communication circuit configured to receive the second automatic trailer capability signal as one or more wired signals corresponding to the one or more towed vehicles.

17. The braking controller according to claim 16, wherein:
the wired communication circuit comprises one or more of:
a wired power line communication (PLC) communication circuit;
an Ethernet network communication circuit, and/or
a wired controller area network (CAN) communication circuit.

18. The braking controller according to claim 1, further comprising:
an intermediate controller in operative communication with the controller second automatic configuration input and with an associated anti-lock braking system (ABS) controller, the intermediate controller being operative to receive a braking capability signal from the associated ABS controller and to deliver the braking capability signal to the controller second automatic configuration input as the second automatic trailer capability signal, the braking capability signal comprising towed vehicle configuration data representative of configuration information of the one or more towed vehicles.

19. The braking controller according to claim 18, wherein:
the intermediate controller comprises a tire pressure monitoring system (TPMS) controller in operative communication with the controller second automatic configuration input and with the associated ABS controller, the TPMS controller receiving the braking capability signal from the associated ABS controller and delivering the braking capability signal to the controller second automatic configuration input as the second automatic trailer capability signal.

20. The braking controller according to claim 1, wherein:
the controller first automatic configuration input comprises a communication circuit in operative selective communication with one or more associated camera devices positioned relative to the one or more towed vehicles to obtain at least one image of the one or more towed vehicles and deliver the at least one image to the wireless communication circuit as the first automatic trailer capability signal.

21. The braking controller according to claim 1, further comprising:
one or more radar devices operatively coupled with the controller first automatic configuration input, the one or more radar devices being positioned relative to the one or more towed vehicles and being operable to obtain at least one distance measure of the one or more towed vehicles relative to the towing vehicle and deliver the at least one distance measure to the controller first automatic configuration input as the first automatic trailer capability signal.

22. The braking controller according to claim 1, further comprising:
one or more Light Detection and Ranging (LIDAR) sensor devices operatively coupled with the controller first automatic configuration input, the one or more LIDAR devices being positioned relative to the one or more towed vehicles and being operable to obtain at least one range measure of the one or more towed vehicles relative to the towing vehicle and deliver the at least one range measure to the controller first automatic configuration input as the first automatic trailer capability signal.

23. The braking controller according to claim 1, wherein:
the controller first automatic configuration input comprises a wireless communication circuit configured to receive from the associated source the first automatic trailer capability signal comprising the first trailer configuration data representative of the expected first value of the equipment parameter as one or more wireless signals.

24. The braking controller according to claim 23, wherein:
the wireless communication circuit comprises one or more of:
a wireless networking WiFi communication circuit receiving wireless WiFi signals as the one or more wireless signals;

a wireless Bluetooth communication circuit receiving wireless Bluetooth signals as the one or more wireless signals;
a wireless dedicated short range communications (DSRC) communication circuit receiving wireless DSRC signals as the one or more wireless signals;
an LDP433 communication circuit receiving wireless LDP433 signals as the one or more wireless signals;
a radio frequency (RF) communication circuit receiving RF signals;
a wireless cellular communication circuit receiving wireless cellular communication signals as the one or more wireless signals; and/or
a wireless satellite communication circuit receiving wireless satellite communication signals as the one or more wireless signals.

25. The braking controller according to claim 1, wherein:
the controller second automatic configuration input comprises a communication circuit configured to transmit a request signal to the one or more towed vehicles of the combination vehicle, and to receive the second automatic trailer capability signal from the one or more towed vehicles responsive to the request signal as one or more automatic combination vehicle configuration signals comprising the second trailer configuration data representative of the reported second value of the equipment parameter of the one or more towed vehicles provided by the one or more towed vehicles of the combination vehicle.

26. The braking controller according to claim 1, wherein:
the controller first automatic configuration input receives the first automatic trailer capability signal comprising the first trailer configuration data representative of the expected first value of the equipment parameter of the one or more towed vehicles;
the controller second automatic configuration input receives the second automatic trailer capability signal as a null automatic trailer capability signal without the second trailer configuration data representative of the reported second value of the equipment parameter of the one or more towed vehicles; and
the control logic is executable by the processor to determine the non-enhanced braking mode of operation in accordance with the controller second automatic configuration input receiving the null automatic trailer capability signal.

27. The braking controller according to claim 1, wherein the control logic stored in the non-transient memory device is executable by the processor to determine one or more platooning operational parameters of the combination vehicle in accordance with the determined braking mode of the one or more towed vehicles of the combination vehicle,
wherein the control logic is executable by the processor to determine a platooning following distance to be maintained by the towing vehicle relative to an associated vehicle forward of the towing vehicle as a one or more of the platooning operational parameters in accordance with the determined braking mode by increasing the platooning following distance responsive to the non-enhanced braking mode being determined and by decreasing the platooning following distance responsive to the enhanced braking mode being determined,
wherein the control logic is executable by the processor to determine a platooning travel speed limit to be maintained by the towing vehicle as a one or more of the platooning operational parameters in accordance with the determined braking mode by decreasing the platooning travel speed responsive to the non-enhanced braking mode being determined and by increasing the platooning travel speed responsive to the enhanced braking mode being determined,
wherein the control logic is executable by the processor to determine a platooning participation gate of the towing vehicle as a one or more of the platooning operational parameters in accordance with the determined braking mode by not permitting the platooning participation responsive to the non-enhanced braking mode being determined and by permitting the platooning participation responsive to the enhanced braking mode being determined.

28. The braking controller according to claim 1, further comprising:
a brake control output operatively coupled with the processor and with an associated brake control actuator of the towing vehicle configured to deliver brake pressure to the one or more towed vehicles in response to an actuator control signal delivered to the associated brake control actuator via the brake control output; and
wherein the control logic is operable to implement the enhanced braking mode of operation by controlling the actuator control signal to one or more of:
increase a high pulse time of a modulated brake pressure applied by the towing vehicle to the one or more towed vehicles via the associated brake control actuator;
decrease a low pulse time of the modulated brake pressure applied by the towing vehicle to the one or more towed vehicles via the associated brake control actuator; and/or
increase values of one or more pulses of the modulated brake pressure applied by the towing vehicle to the one or more towed vehicles via the associated brake control actuator.

29. A braking controller for use in an associated towing vehicle towing one or more towed vehicles as a combination vehicle, the braking controller comprising:
a processor means;
a controller first automatic configuration input means operatively coupled with the processor means, the controller first automatic configuration input means being operable to receive a first automatic trailer capability signal comprising first trailer configuration data representative of an expected first value of an equipment parameter of the one or more towed vehicles of the combination vehicle provided by an associated source external to the associated towing vehicle and external to the braking controller;
a controller second automatic configuration input means operatively coupled with the processor means, the controller second automatic configuration input means reccivingbeing operable to receive from the one or more towed vehicles a second automatic trailer capability signal comprising second trailer configuration data representative of a reported second value of the equipment parameter of the one or more towed vehicles of the combination vehicle;
memory means operatively coupled with the processor, the memory means storing the first and second trailer configuration data; and
control logic means operatively coupled with the memory means and executable by the processor means to:
perform a comparison between the first trailer configuration data and the second trailer configuration data to determine a comparison result; and determine a braking mode of the one or more towed vehicles of the combination vehicle as a one of an enhanced braking mode in accordance with a first comparison result of the comparison or a non-enhanced braking mode in accordance with a second comparison result of the comparison, the first comparison result being different than the second comparison, wherein the non-enhanced braking mode applies a first level of braking force to the one or more towed vehicles of the combination vehicle in a predetermined reduced proportion relative to a commanded level of braking force applied to the towing vehicle of the combination vehicle, wherein the enhanced braking mode applies a second level of braking force to the one or more towed vehicles of the combination vehicle greater than the first level of braking force.

30. The braking controller according to claim 29, wherein:

the controller first automatic configuration input means receives the first automatic trailer capability signal comprising the first trailer configuration data representative of a first quantity of towed vehicles comprising the one or more towed vehicles of the combination vehicle as the expected first value of the equipment parameter of the one or more towed vehicles;

the controller second automatic configuration input means receives the second automatic trailer capability signal comprising the second trailer configuration data representative of a second quantity of towed vehicles comprising the one or more towed vehicles of the combination vehicle as the reported second value of the equipment parameter of the one or more towed vehicles; and the control logic means is executable by the processor means to:
compare the first quantity of towed vehicles of the first trailer configuration data with the second quantity of towed vehicles of the second trailer configuration data;
selectively determine the non-enhanced braking mode of operation in accordance with a non-correspondence between the first and second quantities of towed vehicles; and
selectively determine the enhanced braking mode of operation in accordance with a correspondence between the first and second quantities of towed vehicles.

31. The braking controller according to claim 29, wherein:

the controller second automatic configuration input means comprises a wired communication circuit means configured to receive the second automatic trailer capability signal as one or more wired signals corresponding to the one or more towed vehicles.

32. The braking controller according to claim 29, further comprising:

one or more camera means operatively coupled with the controller first automatic configuration input means, the one or more camera means being positioned relative to the one or more towed vehicles to obtain at least one image of the one or more towed vehicles and deliver the at least one image to the controller first automatic configuration input means as the first automatic trailer capability signal.

33. The braking controller according to claim 29, wherein:

the controller second automatic configuration input means comprises a communication circuit means configured to transmit a request signal to the one or more towed vehicles of the combination vehicle, and to receive the second automatic trailer capability signal from the one or more towed vehicles responsive to the request signal as one or more wireless automatic combination vehicle configuration signals representative of the reported second value of the equipment parameter corresponding to the one or more towed vehicles.

34. A braking control method for use with an associated towing vehicle towing one or more towed vehicles as a combination vehicle, the braking control method comprising:

receiving at a controller first automatic configuration input operatively coupled with a processor a first automatic trailer capability signal comprising first trailer configuration data representative of an expected first value of an equipment parameter of the one or more towed vehicles of the combination vehicle provided by an associated source external to the associated combination vehicle and external to the associated towing vehicle;

receiving at a controller second automatic configuration input operatively coupled with the processor a second automatic trailer capability signal comprising second trailer configuration data representative of a reported second value of the equipment parameter of the one or more towed vehicles of the combination vehicle provided by the one or more towed vehicles;

storing the first and second trailer configuration data in a memory operatively coupled with the processor;

performing by control logic operatively coupled with the memory and executable by the processor a comparison between the first trailer configuration data and the second trailer configuration data to determine a comparison result; and determining by the control logic a braking mode of the one or more towed vehicles of the combination vehicle as a one of an enhanced braking mode in accordance with a first comparison result of the comparison or a non-enhanced braking mode in accordance with a second comparison result of the comparison, the first comparison result being different than the second comparison, wherein the non-enhanced braking mode applies a first level of braking force to the one or more towed vehicles of the combination vehicle in a predetermined reduced proportion relative to a commanded level of braking force applied to the towing vehicle of the combination vehicle, wherein the enhanced braking mode applies a second level of braking force to the one or more towed vehicles of the combination vehicle greater than the first level of braking force.

35. The braking control method according to claim 34, further comprising:

receiving by the controller first automatic configuration input the first automatic trailer capability signal comprising the first trailer configuration data representative of a first quantity of towed vehicles comprising the one or more towed vehicles of the combination vehicle as the expected first value of the equipment parameter of the one or more towed vehicles;

receiving by the controller second automatic configuration input the second automatic trailer capability signal comprising the second trailer configuration data representative of a second quantity of towed vehicles comprising the one or more towed vehicles of the combination vehicle as the reported second value of the equipment parameter of the one or more towed vehicles;

comparing by the control logic the first quantity of towed vehicles of the first trailer configuration data with the second quantity of towed vehicles of the second trailer configuration data;

selectively determining by the control logic the non-enhanced braking mode of operation in accordance with a non-correspondence between the first and second quantities of towed vehicles; and selectively determining by the control logic the enhanced braking mode of operation in accordance with a correspondence between the first and second quantities of towed vehicles.

* * * * *